United States Patent
Achilles et al.

(10) Patent No.: US 9,304,937 B2
(45) Date of Patent: Apr. 5, 2016

(54) ATOMIC WRITE OPERATIONS FOR STORAGE DEVICES

(71) Applicant: NetApp, Inc., Sunnyvale, CA (US)

(72) Inventors: Greg William Achilles, Denver, CO (US); Gordon Hulpieu, Boulder, CO (US); Donald Roman Humlicek, Wichita, KS (US); Martin Oree Parrish, Boulder, CO (US); Kent Prosch, Boulder, CO (US); Alan Stewart, Frisco, CO (US)

(73) Assignee: NetApp Inc., Sunnyvale, CA (US)

( * ) Notice: Subject to any disclaimer, the term of this patent is extended or adjusted under 35 U.S.C. 154(b) by 112 days.

(21) Appl. No.: 14/163,913

(22) Filed: Jan. 24, 2014

(65) Prior Publication Data

US 2015/0113224 A1 Apr. 23, 2015

Related U.S. Application Data

(60) Provisional application No. 61/894,742, filed on Oct. 23, 2013.

(51) Int. Cl.
*G06F 12/08* (2006.01)
*G06F 11/14* (2006.01)

(52) U.S. Cl.
CPC ........ *G06F 12/0891* (2013.01); *G06F 12/0815* (2013.01); *G06F 11/1471* (2013.01); *G06F 12/0873* (2013.01)

(58) Field of Classification Search
None
See application file for complete search history.

(56) References Cited

U.S. PATENT DOCUMENTS

| 5,379,417 A | 1/1995 | Lui et al. |
| 6,170,063 B1 | 1/2001 | Golding |
| 6,477,617 B1 | 11/2002 | Golding |
| 2005/0177687 A1* | 8/2005 | Rao ............................... 711/118 |
| 2009/0055590 A1* | 2/2009 | Takahashi ..................... 711/119 |

OTHER PUBLICATIONS

"Teradata Data Warehouse Appliance Accelerated by NetApp E-Series Storage", https://communities.netapp.com/servlet/JiveServlet/previewBody/23525-102-2-41827/NTAP_TD_WriteBackCache_SB_030513_FINAL.pdf 2013 , 2 pages.
"Why NetApp Storage Innovations Power Every Teradata Data Warehouse Platform", https://communities.netapp.com/servlet/JiveServlet/previewBody/29506-102-1-49822/NTAP_Partnership_Top10_042913.pdf 2013 , 2 pages.
Ouyang, Xiangyong et al., "Beyond Block I/O: Rethinking Traditional Storage Primitives", High Performance Computer Architecture (HPCA), 2011 IEEE 17th International Symposium Feb. 2011 , pp. 301-311.

* cited by examiner

*Primary Examiner* — Kris Rhu
(74) *Attorney, Agent, or Firm* — Haynes and Boone, LLP

(57) ABSTRACT

Atomic write operations for storage devices are implemented by maintaining the data that would be overwritten in the cache until the write operation completes. After the write operation completes, including generating any related metadata, a checkpoint is created. After the checkpoint is created, the old data is discarded and the new data becomes the current data for the affected storage locations. If an interruption occurs prior to the creation of the checkpoint, the old data is recovered and any new is discarded. If an interruption occurs after the creation of the checkpoint, any remaining old data is discarded and the new data becomes the current data. Write logs that indicate the locations affected by in progress write operation are used in some implementations. If neither all of the new data nor all of the old data is recoverable, a predetermined pattern can be written into the affected locations.

16 Claims, 9 Drawing Sheets

ATOMIC WRITE OPERATIONS FOR STORAGE DEVICES

BACKGROUND

Aspects of the inventive subject matter generally relate to the field of storage devices, and, more particularly, to write operations to storage devices.

A data center can employ any one of the various available data storage technologies. Some data storage technologies are directed to the architectural/organization aspect of storage (e.g., network attached storage and storage area network). Some data storage technologies relate to how data is transmitted to and from storage devices (e.g., Fibre Channel and Internet Small Computer System Interface (iSCSI)). Other data storage technologies relate to data redundancy and performance (e.g., various RAID levels for storage). Regardless of the particular data storage technology or combination of data storage technologies employed by a data center, computers ("hosts") perform read and write operations to the storage devices in accordance with the employed data storage technology(ies). The hosts perform the read and write operations via storage controllers associated with the storage devices.

These operations, in particular write operations, can be susceptible to adverse events, such as power loss. The controllers often employ caching. If power is lost while a controller is performing a write operation, the cache may contain a combination of new data (the data being written) and old data (the data existing in the cache and/or on disk prior to completion of the write operation).

In some scenarios, a failed operation can be overcome by performing the same operation again. If a power loss impacts the controller (but not the host) before a write operation completes, the host can request the write operation again once the controller is available again. In that case, the controller would request the write operation again upon determining that the controller never completed the write operation (e.g., no acknowledgement is received by the host from the controller).

SUMMARY

Maintaining the integrity of data can be very important. Adverse events, such as power losses, can occur at any time and can impact data integrity. Computers, devices, etc., frequently write data to storage devices, and adverse events can interrupt the write operations. These interrupted write operations can result in incomplete data being stored on a storage device. In other words, when a write operation is interrupted, the resulting data on the storage device can be a combination of old data and new data, which might be unusable to the device that requested the write operation. However, if the data is consistent (i.e., all old or all new), it is generally usable, even if outdated. Further, if the data cannot be recovered, indicating that the data is unreliable or invalid can prevent use of data that may appear to be usable but is not valid. However, a component, such as a storage controller, can perform atomic write operations that ensure that data on a storage device is all old or all new if an interruption occurs during the atomic write operation and the data is recoverable. If the data is not recoverable, the component can indicate that the data is unreliable or invalid.

In order to perform atomic write operations for implementations using a write-back cache, the old data is maintained in the cache until the new data is completely written into the cache. Further, any metadata associated with the new data is created and stored, including a checkpoint that indicates the completion of the atomic write operation. Once the atomic write operation is completed, the old data is discarded. By maintaining the old data in the cache until the write operation is completed, the old data can be recovered if the atomic write operation is interrupted. Once the atomic write operation completes, if an interruption occurs prior to the discarding of the old data, the old data can be discarded at a later opportunity. Once the old data is discarded, the new data takes the place of the old data.

In order to perform atomic write operations for implementations using a write-through cache, a write log is maintained. The write log contains entries indicating which locations (e.g., locations in cache and/or locations on a storage device) are affected by the atomic write operation. When the atomic write operation completes, the associated entry is removed from the log. If an interruption occurs during the atomic write operation, the write log can be read to determine if any atomic write operations were interrupted. If one or more atomic write operations were interrupted, predetermined patterns of data can be written into the affected locations. If all of the data associated with the atomic write operation is in cache, however, the data can be flushed to the storage device.

BRIEF DESCRIPTION OF THE DRAWINGS

The disclosures may be better understood, and numerous objects, features, and advantages made apparent to those skilled in the art by referencing the accompanying drawings.

DESCRIPTION OF DISCLOSURE(S)

Figure 1:
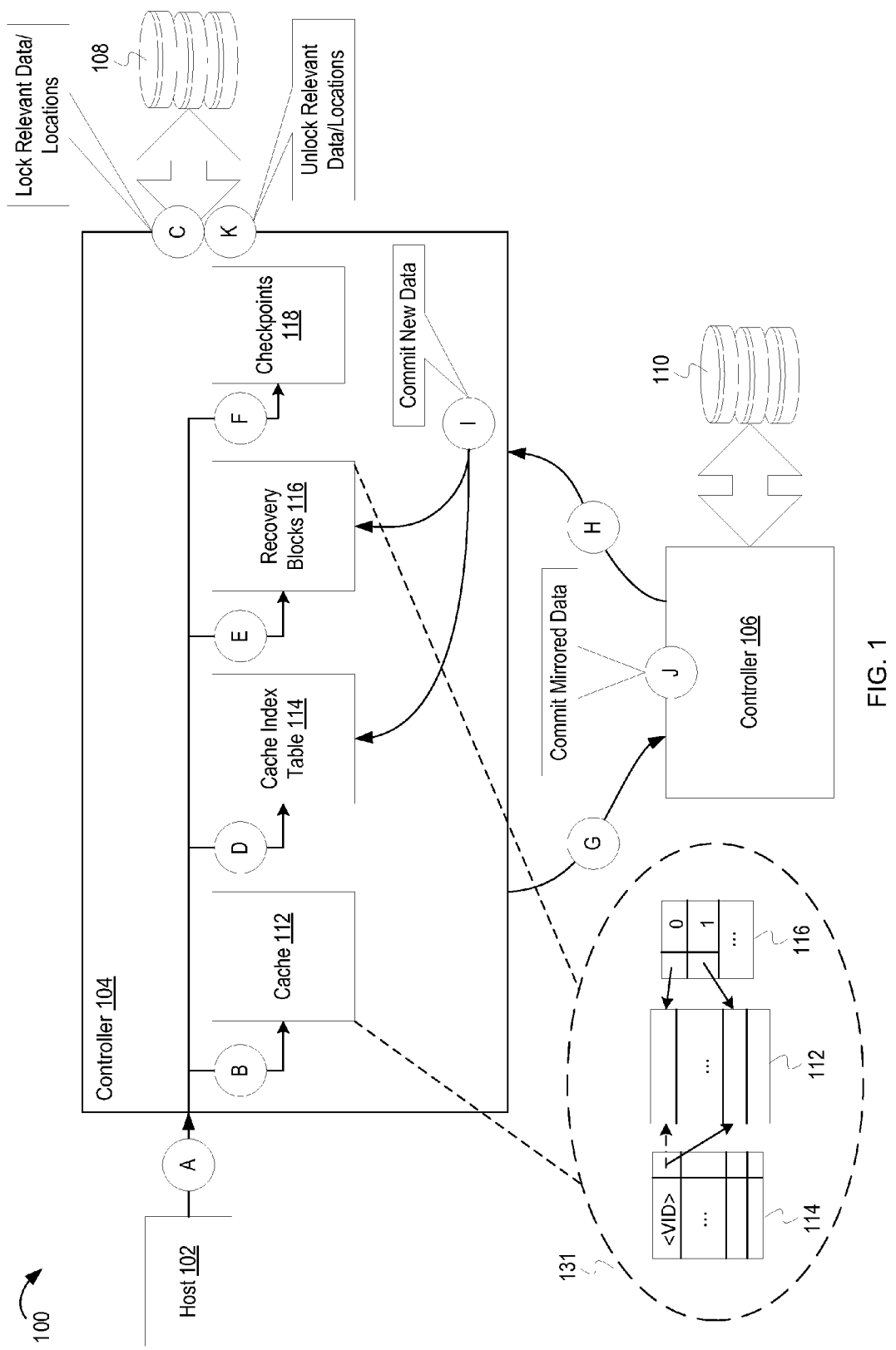
FIG. 1 depicts an example system for performing atomic write operations by a storage controller using a write-back cache.

The description that follows includes exemplary systems, methods, techniques, instruction sequences and computer program products that embody techniques of the inventive subject matter. However, it is understood that the described aspects may be practiced without these specific details. For instance, although examples refer to the SCSI protocol, other communications protocols can be used. In other instances, well-known instruction instances, protocols, structures and techniques have not been shown in detail in order not to obfuscate the description.

INTRODUCTION

Providing an "atomic" write operation for writes to data storage requested by a host allows coherent presentation of data despite interruptions (e.g., power loss, hardware failure, etc.). A storage controller can be implemented to preserve old data associated with a write operation until the storage controller completes the write operation. If interrupted before the storage controller completes the write operation, the storage controller can present the preserved data from the storage controller cache. If the storage controller completes the write operation, then the storage controller can present the newly written data from the storage controller cache. The storage controller presents either a view of the cached data that is consistent with a completed state of the write operation or a view of the cached data that is consistent with a pre-write state. Thus, the write operation is considered "atomic" because it either is performed to completion or is not performed from the perspective of the requesting host. The write operation cannot be partially performed regardless of interruption. Further, the controller can implement the atomic write operations in a manner that facilitates system redundancy.

Although implementations can vary, a general model that is useful for illustrating the inventive subject matter includes a host, a storage controller (hereinafter "controller") coupled with the host, and a storage device coupled with the controller. The host is a computer system that reads and writes data to storage via the controller. In other words, the host communicates commands/requests and data to the controller while the controller interacts directly with the storage device(s). The controller can provide a variety of interfaces to the storage device, increasing the flexibility of the storage device. For example, the storage device might comprise a single hard drive, but the controller can provide an interface to the host that makes the single hard drive appear as multiple volumes. The storage device might comprise multiple hard drives, but the controller can provide an interface to the host that makes the multiple hard drives appear as a single volume. In other words, the controller can provide an abstracted view of the storage device, hiding many of the details from the host, thus reducing the complexity of interacting with the storage device.

Because reading data from and writing data to storage devices can be fairly slow (in computing terms), the controller can include a cache. The cache can be memory similar to the RAM (Random Access Memory) or cache in a computer. But the storage controller cache can be persistent across losses of power. When data requested by the host is in the cache, the controller does not read the data from the storage device but from the cache instead. Similarly, data can be written to the cache first, allowing the controller to send a confirmation that the write completed more quickly than if the controller wrote the data directly to the storage device.

Similar to other caches, the controller cache can be implemented as a write-through cache or a write-back cache. When data is written to a write-through cache, the data is also written to a storage device(s). When data is written to a write-back cache, the data is not necessarily written to a storage device(s). With the write-back cache, the data can be "flushed" from the cache (written to a storage device) at various points in time. For example, if the cache is full and new data is written to a location that is not represented in the cache, a cache entry may be "evicted". When the cache entry is evicted, the controller writes the data associated with the evicted cache entry to the storage device and replaces the data associated with the evicted entry with the new data.

Example Structures to Provide Atomic Write Operations

This description refers to "recovery blocks" and a "cache index table" when describing example implementations of a storage controller providing atomic write operations. These structures are used for illustrative purposes. Implementations can utilize a variety of structures, organize data in a different manner, and employ different naming schemes to facilitate atomic write operations by a storage controller. For example, the cache index table described herein maps locations on volumes to cache blocks, allowing cache blocks to be located. The specific implementation of this mapping functionality can vary. For example, hash tables, sorted linked lists, arrays, trees (single or multi-level), etc., as well as combinations thereof, can be used to locate cache blocks.

Many computers provide a single view of memory in which every memory location available is indicated by a unique address. Thus, a cache in a computer can be indexed using only the memory address. A controller, on the other hand, may be representing one or more coupled storage devices as multiple volumes to the host. Each volume will generally share many of the same memory addresses. For example, the first gigabyte of memory on a first volume will generally share the same addresses as the first gigabyte of memory on a second volume. Because multiple volumes might include the same address, indexing a cache by addresses could result in data from one volume overwriting data from another volume. To prevent collisions the controller can utilize a cache index table to act as an index into the cache. The cache index table can be indexed by both the address and a volume identifier. Thus, writes to the same address for different volumes can be associated with different entries in the cache index table, which in turn are associated with different entries in the cache.

For example, the cache can comprise cache blocks (sometimes referred to as "cache lines"). Each cache block can be associated with an index. For example, the first cache block might be associated with an index of 1, the second cache block might be associated with an index of 2, etc. Each entry in the cache index table is associated with a volume identifier and a memory address, for example. The volume identifier and the memory address act as the index for a particular entry in the cache index table. In order to look up the location of data in the cache, the controller locates an entry in the cache index table using at least the volume identifier and the memory address targeted by the write. If the controller locates the entry, the controller uses the associated cache index as the index for the cache. If an entry is not found in the cache index table, that generally indicates that the target of the write is not represented in the cache. If the controller received a command to write data, the controller can look for an entry in the cache index table associated with the memory address specified for the write. If found, the controller can write the data to the cache block indicated by the cache index entry.

The controller can also include recovery blocks. A recovery block is metadata about a cache block, and can be useful with write-back caches. Each cache block has an associated recovery block. A recovery block can indicate whether the data located in the associated cache block is data from prior to a write operation ("old data") or a result of the write operation ("new data"). Proximate to new data being written into a cache block, the associated recovery block is set to indicate that the cache block hosts new data. After the data associated with the write is written to the cache block, the controller sets the associated recovery block to indicate that the cache block hosts old data. If an interruption occurs while data is being written to a cache block, the old data can be recovered.

Example Illustrations

FIG. 1 depicts an example system for performing atomic write operations by a storage controller using a write-back cache. FIG. 1 depicts a system 100, including a host 102, a controller 104, and a second storage controller 106. The controller 104 is connected with a first storage device 108, which comprises one or more drives. The second controller 106 is connected with a second storage device 110, which comprises one or more drives. The controller 104 comprises a cache 112, a cache index table 114, a set of recovery blocks 116, and a set of checkpoints 118. The second controller 106 is configured similarly.

The host 102 can be coupled with the controller 104 in a variety of ways. For example, the host 102 can be coupled with the controller 104 over a network, such as a SAN (Storage Area Network) or a LAN (Local Area Network), using Fibre Channel technology, Serial Attached SCSI (Small Computer System Interface), etc. The controller 104 can be installed in the host 102 using technology such as PCI (Peripheral Component Interconnect) or integrated directly into the host 102 motherboard, etc. The controller 104 can be coupled with the second controller 106 in a similar manner as the host 102 to the controller 104.

Similarly, the controller 104 can be coupled with the first storage device 108 in a variety of ways. For example, the various technologies available to couple the host 102 with the controller 104 may be available for coupling the controller 104 to the first storage device 108. The controller 104 may be coupled with the first storage device 108 using technology that is different from that used to couple the host 102 with the controller 104. The first storage device 108 can be integrated with the host 102 and/or the controller 104. The second storage device 110 can be similarly coupled with the second controller 106.

Although not depicted, additional hosts can be coupled with the controller 104. Further, the host 102 can be coupled with the second controller 106, and additional components may be located between the host 102 and the controller 104. While two controllers are used to illustrate the use of redundant controllers for failover functionality, the subject matter can apply to the use of a single controller or the use of more than two controllers. Similarly, while only one storage device is depicted as coupled with a controller, each controller can be coupled with more than one storage device. Further, multiple controllers can be coupled with the same storage devices. For example, the second controller 106 can be coupled with the first storage device 108 instead of the second storage device 110, the controller 104 can be coupled with both the first storage device 108 and the second storage device 110 and the second controller 106 can be coupled with both the first storage device 108 and the second storage device 110, etc.

At stage A, the host 102 transmits, to the controller 104, a write command and the associated data to write. The write command can specify a volume identifier, memory address(es), length, etc. The write command and the data can conform to a particular protocol, such as the SCSI protocol, IP (Internet Protocol), etc. The amount of data transmitted can vary based on the protocol specifications, the total amount of data to write, etc. In some implementations, the volume identifier transmitted by the host 102 is different than the volume identifier used by the controller 104. The controller 104 can translate a host-specific volume identifier by looking up the non-host specific volume identifier using a host identifier and the host-specific volume identifier. For the purposes of the discussion herein, it will be assumed that the volume identifier received with the write command is the same volume identifier used by the controller.

At stage B, the controller 104 writes the data to the cache 112. The data can be written to one or more cache blocks, depending on the amount of data. The controller 104 can select the cache blocks using a variety of techniques, including a least recently used algorithm, random replacement, etc. The write command might specify a set of memory addresses that begin or end in the middle of a cache block (i.e., are "unaligned" writes). For example, a volume might be divided into logical blocks, and a cache block might comprise multiple logical blocks. The particular protocol used might specify that logical blocks are the smallest addressable unit. In such an implementation, each write command would specify an indication of a logical block (such as the memory address associated with the beginning of the logical block) that the data should be written to. The controller 104 can then write the data to a set of logical blocks beginning with the logical block specified by the write command and any additional consecutive logical blocks until all of the data is written. Because a cache block can comprise multiple logical blocks and the logical block is the smallest addressable unit, the write operation might begin in the middle of a cache block, include all logical blocks of one or more intermediate cache blocks, and end in the middle of a final cache block. Similarly, a write operation may begin and end in the middle of a cache block, not include intermediate cache blocks, etc.

When the controller 104 writes the data to the cache 112, the controller 104 does not overwrite existing data for the same memory addresses. Instead, the controller 104 writes the data to a different cache block, thus preserving the existing data. If the existing data was overwritten, any data not written back to the first storage device 108 would be lost and thus unrecoverable. The status (old or new) indicated by the recovery block(s) associated with the cache block(s) in which the data is written can be used to differentiate between cache blocks associated with the same memory addresses. The use of recovery blocks and recovery of data after an interruption is described later.

At stage C, data associated with the controller 104 and the first storage device 108 that is modified in response to a write command is locked. For example, the cache blocks that data was written to at stage B might be locked, as well as stripes or other data units on the first storage device 108 that are associated with the cache blocks. Locking the locations of modifiable data and/or metadata prevents other write operations from changing the data before the write command received at stage A is complete. If other write operations could modify the data prior to the completion of the write operation associated with the write command received at stage A, the write operation would not be atomic due to the fact that the data could be a mixture of both write operations.

The various structures can be locked in a variety of ways. For example, the controller 104 might indicate to the first storage device 108 that certain portions of the first storage device 108 should be locked, which can prevent other entities (such as other controllers) from modifying the associated data directly on the first storage device 108. The controller 104 can also insert any write commands affecting the associated memory locations into a queue, thus delaying the associated write operations until after the write operation associated with the write command received at stage A is complete. Metadata associated with the structures can also be updated to indicate that the structure is locked. For example, the controller 104 might set a flag for each associated cache block that indicates the cache block cannot be written to.

At stage D, the controller 104 inserts indications of the write operation into the cache index table 114. As described above, the cache index table 114 can include a volume identifier, a memory address (or range), and an index into the cache 112. A dashed oval 131 depicts a detailed view of example relationships and data for the cache 112, the cache index table 114, and the recovery blocks 116. For this example, the cache index table 114 is depicted as being indexed by a volume identifier (VID). Thus, the controller 104 inserts into the cache index table 114 indications of at least the volume identifier associated with the write operation, the memory address(es) associated with the write operation, and a reference into the cache 112 where the data is located.

The controller 104 might insert multiple entries into the cache index table 114. For example, each entry in the cache index table 114 might be defined as only including one reference into the cache 112, and thus only representing a single cache block. Thus, the controller 104 might insert an entry into the cache index table 114 for each cache block that was written to at stage B. The particular implementation can vary. For example, each entry in the cache index table 114 can indicate a plurality of references, the references can be for logical blocks within a cache block, etc.

At stage E, the controller 104 updates the recovery blocks 116 associated with the cache blocks written to at stage B. As stated above, a recovery block contains metadata about an associated cache block. Thus, the recovery blocks 116 can be implemented as a structure that includes the same number of entries as there are cache blocks. Each recovery block can be indexed using the same indexes as the cache blocks, thus allowing the controller 104 to access the recovery block associated with a particular cache block by using the same index. In some implementations, the recovery blocks 116 can be associated with other data units, such as logical blocks, and the implementation of the recovery blocks 116 can vary accordingly.

While the recovery blocks 116 might contain various pieces of metadata associated with the cache blocks, the example recovery blocks 116 described herein each include an indication, such as a flag, of the status of the associated cache block. For example, as described above, the indication can specify whether a cache block associated with the recovery block is old or new data. For each cache block written to at stage A, the associated recovery block is updated at stage E to indicate that the data in the cache block is new. Additional updates might be made depending on the specific implementation and the particular metadata stored in the recovery blocks 116. The example recovery blocks 116 depicted in the view 131 use a binary flag to indicate whether a referenced cache block is old or new. In this example illustration, the top entry of the recovery blocks 116 references a top block of the cache 112 and has a '0' to indicate that the referenced cache block hosts old data. Prior to being updated, a top entry in the cache index table 114 also referenced the top block of the cache 112 as illustrated with a dashed arrow. After the new data was written into the cache 112, the top entry in the cache index table was updated to reference the location of the new data as illustrated with the solid arrow from the top entry in the cache index table 114 to the penultimate entry in the cache 112. Afterwards, a second entry in the recovery blocks 116 will be updated to also reference that penultimate entry in the cache 112 and to indicate that the penultimate cache block hosts new data as depicted by the '1' in the second entry of the recovery blocks 116.

At stage F, the controller 104 inserts a new checkpoint into a table of checkpoints 118. The checkpoints 118 indicate that the data for write operations associated with the checkpoints have been written to the cache 112 and all of the metadata associated with the write operation and/or data has been completely updated. In other words, a checkpoint indicates that an atomic write operation has completed, and the old data can be safely discarded. A checkpoint can indicate the volume identifier and memory addresses associated with the completed write operation. The checkpoints 118 can be a list, as described above, a table, or any other data structure that facilitates their use as described herein. Further, in implementations that include redundant/failover controllers, the checkpoint can include an indication of whether all additional controllers have the data (i.e., the data received at stage A and all associated metadata has been mirrored and or created on all additional controllers).

Prior to the completion of stage F, only the old data and the associated metadata was completely stored, while only a portion of the new data and the associated metadata was stored. Thus, if an interruption occurred prior to the completion of stage F, the controller 104 would be able to roll back the data by discarding references to the cache blocks that had the new data written to them, marking the cache blocks invalid, etc. Upon the completion of stage F, all of the old data exists in the cache 112 along with all of the new data, and all of the metadata for both the old data and new data are properly stored. Thus, the controller 104 can either roll back to the old data (by discarding the new data) or "commit" the new data by discarding the old data (if located in the cache) and indicating that the new data is now the old data.

At stage G, the controller 104 mirrors, to the second controller 106, the data and metadata associated with the write operation performed in response to the write command received at stage A. The mirroring of the data and metadata can be implemented in a variety of ways. For example, the controller 104 can forward the write command and associated data received at stage A to the second controller 106, allowing the second controller 106 to perform the above described operations. The controllers can be implemented such that the controller 104 writes the data to the second controller 106 directly, including associated metadata. Similarly, the second controller 106 can implement an interface that allows the controller 104 to specify the data and metadata to be mirrored without directly writing it to the associated structures in the second controller 106. In other words, while the host 102 generally does not have access to the internal components and structures of the controller 104, the controller 104 may have lower level access to the internal components and structures of the second controller 106, whether through an interface or directly. Generally, the data and the metadata can be mirrored in the same order it was written/generated above, with the checkpoint being mirrored last.

At stage H, the controller 104 receives an indication that the mirroring to the second controller 106 of the data and metadata is complete. The indication can take a variety of forms. For example, the second controller 106 can send an indication that explicitly indicates that the mirroring is complete. If the controller 104 mirrors the data and metadata using a series of commands, for example, the controller 104 can receive an implied indication from the second controller 106 when it receives an acknowledgement that the last command has completed. In some implementations, the indication can also be detected by the controller 104. For example, the controller 104 might read a value from the second controller 106 that indicates that the mirroring is complete. The specific form of the indication and how it is received can vary based, at least in part, on how the mirroring of the data and metadata is implemented. Once the controller 104 receives the indication that the mirroring to the second controller 106 is complete, the controller 104 updates the checkpoint to indicate that the mirroring was completed.

At stage I, the controller 104 commits the new data, which then becomes the old data. To commit the new data, the controller 104 can first discard the old data. As described above, the old data can be discarded by removing references to the old data, thus allowing the associated memory and metadata to be overwritten. If the old data does not exist in the cache (e.g., only exists on a backing store), there may be no references to remove. Similarly, the cache blocks can be marked as invalid or otherwise be associated with an indication that the data can be overwritten. Regardless of the implementation, the locations in which the old data and metadata associated with the old data are stored become available for other uses.

Once the old data is discarded, the metadata associated with the new data is updated to indicate that the new data is now considered old data. Thus, when the controller 104 is discarding the old data, the controller 104 ensures that it is clear that the discarded data is no longer valid. Otherwise, the cache index table 114 and recovery blocks 116 would contain multiple entries with the same volume identifier and memory address(es) that would be indistinguishable.

The metadata can be updated by changing the status in the associated recovery blocks 116 to indicate that the data is old. Similarly, the associated cache index table entry may include a flag or mechanism for indicating that the particular entry is no longer valid. The cache blocks in the cache 112 may also include a flag or mechanism for indicating that the particular cache block is no longer valid. Further, in some implementations, metadata may be removed completely. For example, in some implementations, a cache index table entry may be initialized or otherwise removed from the cache index table 114, thus removing any record of the old data being in the cache. Once the metadata is updated, the checkpoint is deleted.

At stage J, the new data is committed on the second controller 106. The new data on the second controller 106 can be committed similarly to the new data on the controller 104. The implementations can vary similarly to the variations discussed in relation to mirroring the data. For example, in some implementations, the controller 106 can specify the individual operations to commit the data. In some implementations, the controller 106 provides an indication of the data to commit (such as indicating the appropriate volume identifier and memory address(es)) to the second controller 106, which then performs the operations. The operations can be performed in a substantially similar order to that in which they were performed at stage I.

At stage K, the controller 104 unlocks the data that was locked at stage C. Because the write operation has been completed and the associated data committed, the locked data can be unlocked, allowing for further modifications to the data. In order to unlock the data, the controller 104 can update any metadata to indicate that the data is unlocked. If a queue for additional commands is implemented, the controller 104 can proceed to process the next command.

While the above description refers to metadata being located in various locations, implementations can vary. For example, a recovery block is described as including metadata indicating a status of the associated cache block. The metadata indicating the status of the associated cache block can be stored with the cache block itself or the associated entry in the cache index table. Further, the metadata can be stored in multiple places. For example, the status of the cache block can be stored with the cache block itself and the associated recovery block.

Figure 2:
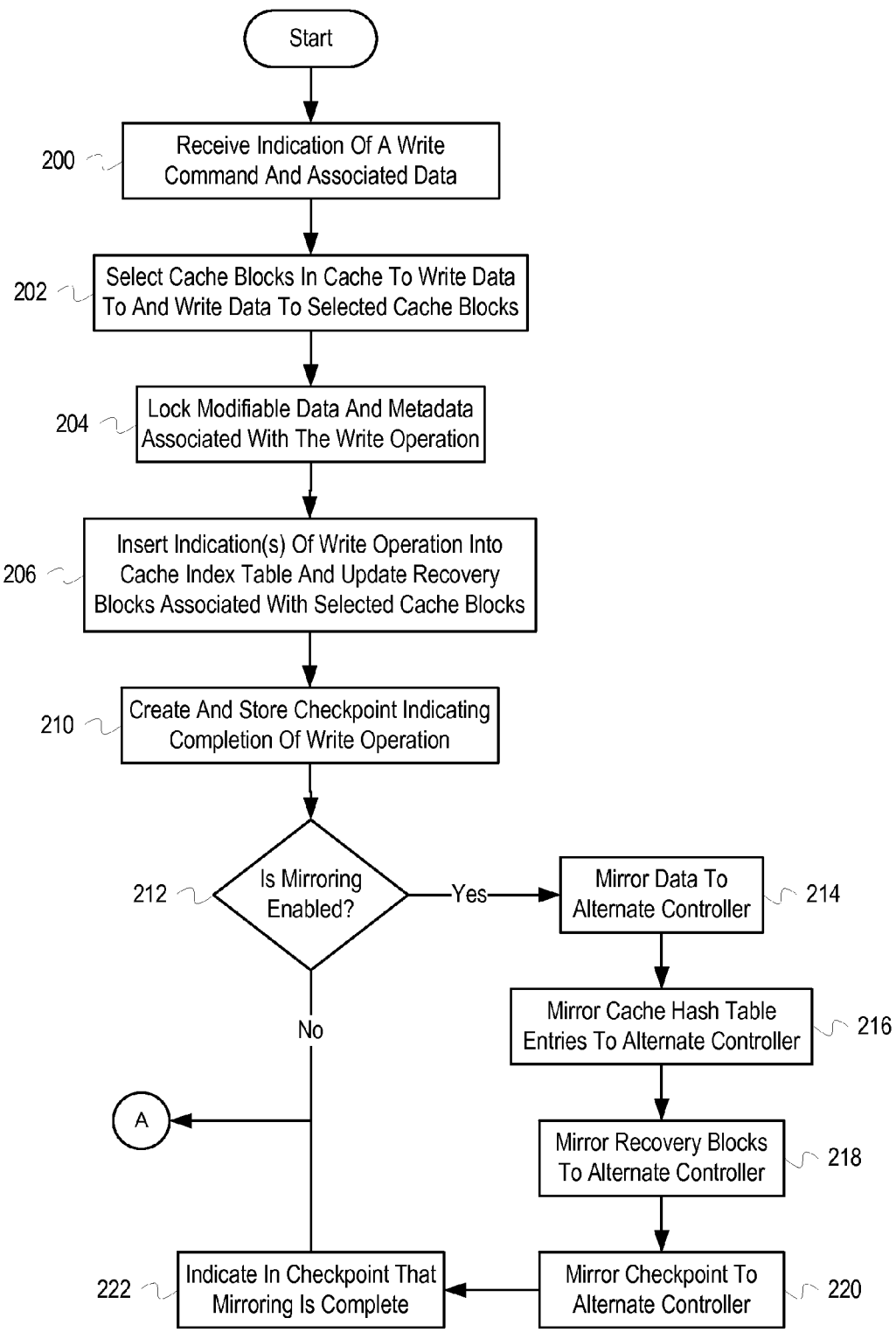
FIG. 2 depicts a flowchart of example operations for performing atomic write operations by a storage controller using a write-back cache.

FIG. 2 depicts a flowchart of example operations for performing atomic write operations by a storage controller using a write-back cache. The operations depicted in FIG. 2 and described below can be performed by the first controller 104 and/or the second controller 106 depicted in FIG. 1, but is not limited to the implementations described above.

At block 200, an indication of a write command and data associated with the write command is received. The indication can include a volume identifier and an indication of a location to write the associated data, such as a memory address. The indication can conform to a particular protocol. The associated data can be received as part of the write command or separately. The associated data can also conform to a particular protocol. The indication might also implicitly or explicitly indicate a range of locations. For example, if the write command specifies a particular byte within memory to write the associated data, but the associated data is thirty-two bytes long, the implicit range of locations are the thirty-two bytes in memory that start at the specified byte. Similarly, the write command might include the starting location as well as the location at which the write operation should end. The descriptions herein assume that the write command implicitly specifies a range of locations by specifying the starting location. However, the operations described can be adapted to other implementations. After the indication of the write command and associated data is received, control then flows to block 202.

At block 202, cache blocks to write the associated data to are selected from a cache and the associated data is written to the selected cache blocks. The cache blocks can be selected using a variety of techniques, as described above. For example, it can be determined that a set of cache blocks are indicated as being invalid, thus being available for use without overwriting existing data. If no cache blocks are indicated as being invalid, the data in cache blocks that are being used can be evicted (written to a backing store), making the cache blocks available for use. Indications of the selected cache blocks are recorded for writing into the cache index table.

The number of cache blocks selected can be determined based on the size of the associated data. In other words, the number of cache blocks selected is large enough to allow the cache blocks to hold all of the associated data. Some implementations can allow "unaligned" write commands, in which the beginning or ending location is not at the beginning or end of a cache block. For example, the cache blocks can comprise multiple logical blocks. The write command might specify that the beginning write address is a logical block in the middle of a cache block. After the cache blocks to write the associated data to are selected from the cache and the associated data is written to the selected cache blocks, control then flows to block 204.

At block 204, modifiable data and metadata associated with the write operation is locked. The data and metadata associated with the write operation can be locked by indicating that the particular locations in which the data and metadata reside cannot be written to. For example, each cache block can be associated with a flag that, when set, indicates that the cache block is locked. The data and metadata associated with the write operation can include the data written to the cache at block 202, cache index table entries, recovery blocks, etc. Further, data existing on any backing store, such as a storage device, can also be locked. For example, an indication of the locations of the data on the backing store can be sent to the backing store, along with an indication that the locations should be locked. Thus, if multiple entities have access to the backing store, a single entity can prevent other entities from modifying the associated data. After the modifiable data and metadata associated with the write operation is locked, control then flows to block 206.

At block 206, one or more indications of the write operation are inserted into a cache index table and recovery blocks associated with the selected cache blocks are updated. The indications of the write operation can include the volume identifier and an indication of the target location to write the data. The target location to write the data corresponds to a location on the storage device associated with the data of a cache block. If an index corresponding to the volume identifier and target location is not found in the cache index table, then an entry is created. Further, the indications of write operations include indexes of the selected cache blocks. For example, the data associated with a write command might be written to cache blocks with indexes 3, 5, and 20. The indications of cache blocks 3, 5, and 20 would thus be written into the entries of the cache index table for the volume identifier and respective target locations. If an entry already exists in the cache index table for the combination of the volume identifier and target location, then the currently indicated cache block(s) is overwritten with the previously recorded indication of cache blocks for the write operation.

Each cache block is associated with a recovery block. Each recovery block includes metadata about the associated cache block, including whether the data contained in the cache block is old data or new data (i.e., is data associated with an in process write operation). The recovery blocks associated with the selected cache blocks are updated to reflect the fact that the data in the selected cache blocks, which were written to at block 202, contain new data. The specific manner in which the recovery blocks are updated will vary based on the implementation of the recovery blocks. For example, each recovery block can include a single bit representing whether the data in the associated cache block is old or new. If the bit is not set (i.e., is set low, or to a value of 0) the data is old, and if the bit is set (i.e., is set high, or to a value of 1) the data is new (or vice versa). The associated recovery blocks can be updated to set the bit to indicate that the data is new. The particular metadata representing whether the cache block data is old or new can also comprise multiple bits, text values, integer values, etc.

As already mentioned, the indications of the write operation used to generate an index for the cache index table can vary. A first indication might include the volume identifier an indication of a location associated with the cache block in which the beginning of the associated data was written in, and a first of the three indexes. A second indication might include the volume identifier, an indication of a location associated with an intermediate cache block in which the associated data was written, and a second of the three indexes. A third indication might include the volume identifier, an indication of a location associated with a cache block in which the last portion of the associated data was written to, and a third of the three indexes. In some implementations, a single indication in the cache index table can include multiple references associated with cache blocks. After one or more indications of the write operation are inserted into the cache index table, control then flows to block 210.

At block 210, a checkpoint indicating that the write operation associated with the write command received at block 200 is complete is created and stored. The checkpoint can include the volume identifier and the locations to which the data was written. The checkpoint provides an indication that all data and metadata associated with the write operation has been written and/or created. The checkpoint also provides an indication of the locations affected by the write operation, which can be used to assist a recovery operation, as described below. The checkpoint can be saved by writing the checkpoint data to memory. The checkpoint can be inserted into a data structure in memory, such as a list or a table. After the checkpoint indicating that the write operation associated with the write command is created and stored, control then flows to block 212.

At block 212, it is determined whether mirroring is enabled. Whether mirroring is enabled can be determined by, for example, reading a flag at a particular memory location. In other words, whether mirroring is enabled can be a setting accessible to the particular component that is responsible for handling write operations. The setting can be set manually, by a user, or set upon determining that prerequisites for mirroring have been satisfied. For example, if a controller is the component responsible for handling the write operation, the controller may determine that an alternate controller is coupled to the controller and that the alternate controller configured to receive data for mirroring. If it is determined that mirroring is enabled, control then flows to block 214. If it is determined that mirroring is not enabled, control then flows to block 300 of FIG. 3.

At block 214, the associated data received at block 200 is mirrored to an alternate controller. Mirroring the associated data results in the alternate controller having a copy of the associated data. The specific techniques used to mirror the associated data to the alternate controller can vary between implementations, however. For example, in some implementations, the same write command and associated data received at block 200 might be sent to the alternate controller, allowing the alternate controller to perform the write operation on its own. In some implementations, the data is written to the cache of the alternate controller directly or using an interface that allows for another component to specify where the data is written. After the associated data is mirrored to the alternate controller, control then flows to block 216.

At block 216, the cache index table entries are mirrored to the alternate controller. Similar to mirroring the associated data to the alternate controller, mirroring the cache index table entries to the alternate controller results in cache index table entries on the alternate controller referencing cache blocks containing the associated data. However, the specific techniques used to mirror the cache index table entries to the alternate controller can vary between implementations, as above. It should be noted that, in some implementations, mirroring the cache index table entries can be implicit. For example, in an implementation in which the mirroring occurs by sending the same write command and associated data received at block 200 to the alternate controller, the alternate controller generates the cache index table entries (or equivalent cache index table entries) independently without the cache index table entries being mirrored explicitly. After the cache index table entries are mirrored to the alternate controller, control then flows to block 218.

At block 218, the recovery blocks associated with the selected cache blocks are mirrored to the alternate controller. Similar to mirroring the associated data and the cache index table entries to the alternate controller, mirroring the associated recovery blocks to the alternate controller results in the associated recovery blocks on the alternate controller containing the same or equivalent data as the associated recovery blocks updated at block 206. However, the specific techniques used to mirror the associated recovery blocks to the alternate controller can vary between implementations, as above. Similarly, in some implementations, mirroring the associated recovery blocks can be implicit, as above. After the associated recovery blocks are mirrored to the alternate controller, control then flows to block 220.

At block 220, the checkpoint is mirrored to the alternate controller. Similar to mirroring the associated data, the cache index table entries, and the associated recovery blocks to the alternate controller, mirroring the checkpoint to the alternate controller results in the alternate controller containing the same or equivalent checkpoint data as created at block 210. However, the specific techniques used to mirror the checkpoint to the alternate controller can vary between implementations, as above. Similarly, in some implementations, mirroring the checkpoint can be implicit, as above. After the checkpoint is mirrored to the alternate controller, control then flows to block 222.

At block 222, the checkpoint is updated to indicate that mirroring is complete. Updating the checkpoint to indicate that mirroring is complete can comprise setting a flag, storing a particular value at a particular location, etc. Indicating that the mirroring is complete can be used during the data recovery process, as described below. After the checkpoint is updated to indicate that the mirroring is complete, control then flows to block 300 of FIG. 3.

Figure 3:
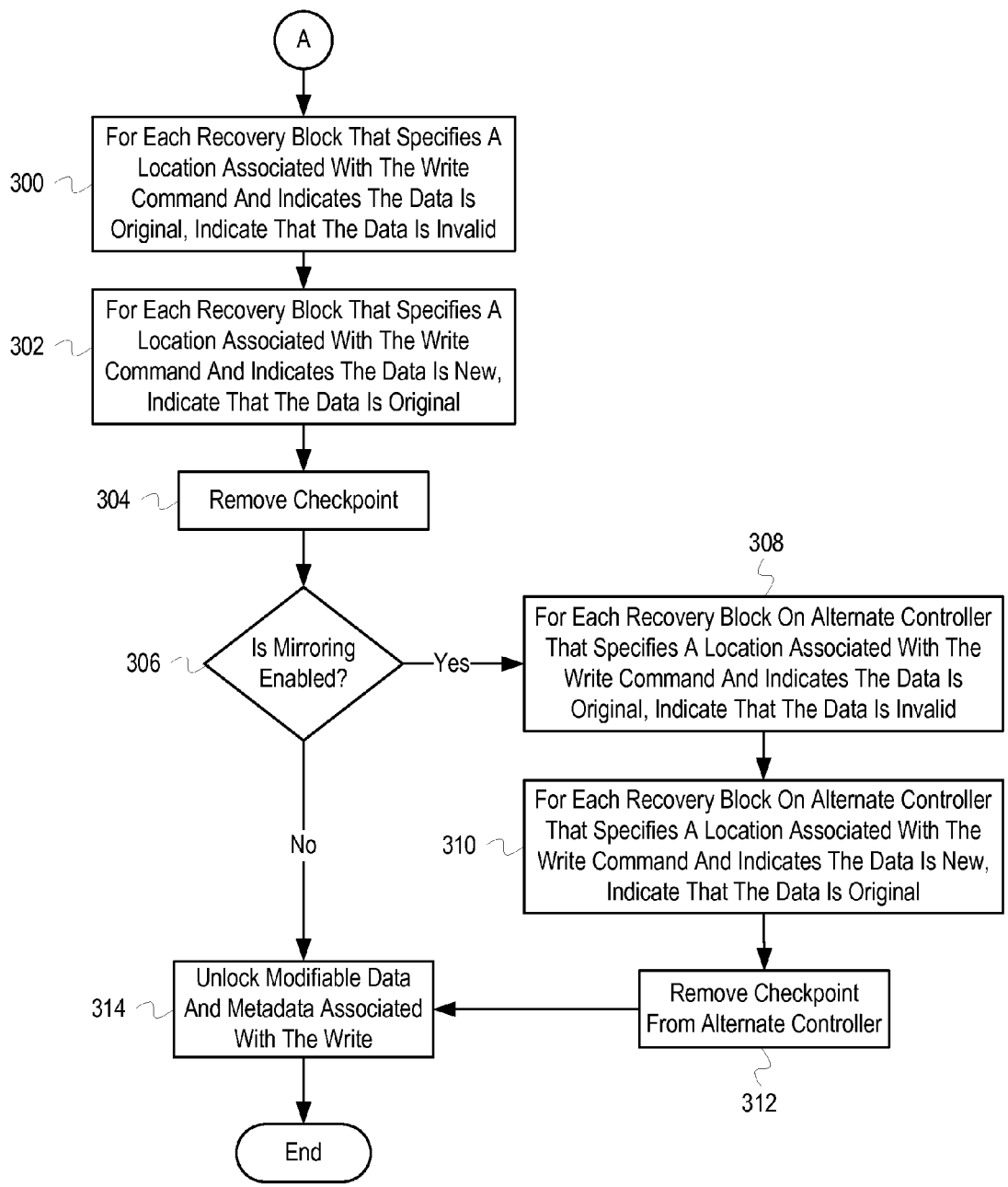
FIG. 3 depicts a flowchart of example operations for committing data associated with an atomic write operation.

FIG. 3 depicts a flowchart of example operations for committing data associated with an atomic write operation. The operations depicted in FIG. 3 and described below can be performed by the first controller 104 and/or the second controller 106 depicted in FIG. 1, but is not limited to the implementations described above.

At block 300, each recovery block that is associated with a location indicated by the write command and that indicates that the data in an associated cache block is old is updated to indicate that the data in the associated cache block is invalid. The set of recovery blocks that are associated with locations specified by the write command is determined. Then, each of the set of recovery blocks is updated to indicate that the data in the cache block associated with the recovery block is invalid. For example, the recovery block might contain a flag that can be set to indicate that the data is invalid. Similarly, the recovery block can contain a variable or other structure that allows for an indication to be stored in the recovery block. Further, the cache block associated with the recovery block can also include an indication that the data in the cache block is invalid, and can be updated accordingly.

The techniques used to determine the set of recovery blocks that are associated with locations specified by the write command can vary between implementations. For example, in some implementations, the recovery blocks can also include volume identifiers and indications of the locations associated with the recovery blocks, like the cache index table. The recovery block data structure can then be searched directly. In some implementations, a separate list can be maintained that includes references to recovery blocks associated with cache block containing old data affected by an in-progress write operation. The list can be searched for recovery blocks with the volume identifier and indications of locations corresponding to the target location. After each recovery block that specifies a location associated with the write command indicates that the associated cache block data is old is updated to indicate that the data is invalid, control then flows to block 302.

At block 302, each recovery block that is associated with a location specified by the write command and indicates that the data in an associated cache block is new is updated to indicate that the data in the associated cache block is old. The techniques used to determine and update the set of recovery blocks that are associated with a location specified by the write command can be substantially similar to those of block 300. However, instead of updating the found recovery blocks if they indicate that the associated cache block data is old, the recovery blocks are updated if they indicate that the associated cache block data is new. It should be noted that if the operations performed at block 300 are completed properly, no recovery block that specifies a location associated with the write command should indicate that the associated cache block data is old, as all such recovery blocks should be updated at block 300. After each recovery block that specifies a location associated with the write command and indicates that the associated cache block data is new is updated to indicate that the data is old, control then flows to block 304.

At block 304, the checkpoint created and stored at block 210 is removed. The removal of the checkpoint can vary between implementations. For example, the removal of the checkpoint can comprise initializing the data that represents the checkpoint, setting a flag, etc. After the checkpoint is removed, control then flows to block 306.

At block 306, it is determined whether mirroring is enabled. Determining whether mirroring is enabled can be accomplished in a substantially similar manner as accomplished at block 212 of FIG. 2. If it is determined that mirroring is enabled, control then flows to block 308. If it is determined that mirroring is not enabled, control then flows to block 314.

At block 308, each recovery block on the alternate controller that specifies a location associated with the write command and indicates that the data in an associated cache block is old is updated to indicate that the data in the associated cache block is invalid. As described above, the alternate controller can allow for various levels of access to the alternate controller's internal components and structures. The implementation of updating the recovery block can vary accordingly. For example, in some implementations, a command can be issued to the alternate controller that indicates that the operations performed at block 300 should be performed on the alternate controller. In some implementations, the alternate controller's internal components and structures are accessed directly, allowing the operations performed at block 300 to be performed by the same component that performs the operations at block 300. In other words, the operations performed at block 308 can be substantially similar to the operations performed at block 300, and can vary similarly. The techniques used to initiate the operations at block 308 and the component that performs the operations at block 308 can vary according to the implementation. After each recovery block on the alternate controller that specifies a location associated with the write command and indicates that the associated cache block data is old is updated to indicate that the data is invalid, control then flows to block 310.

At block 310, each recovery block on the alternate controller that specifies a location associated with the write command and indicates that the data in an associated cache block is new is updated to indicate that the data in the associated cache block is old. The techniques used to determine and update the set of recovery blocks on the alternate controller that specify a location associated with the write command can be substantially similar to those of block 302 and/or block 308. However, instead of updating the found recovery blocks if they indicate that the associated cache block data is old, the recovery blocks are update if they indicate that the associated cache block data is new. After each recovery block on the alternate controller that specifies a location associated with the write command and indicates that the associated cache block data is new is updated to indicate that the data is old, control then flows to block 312.

At block 312, the checkpoint mirrored to the alternate controller at block 220 of FIG. 2 is removed from the alternate controller. The techniques used to remove the checkpoint from the alternate controller can be substantially similar to those described at block 220 of FIG. 2. The techniques used to initiate the operations at block 312 and the component that performs the operations at block 312 can vary according to the implementation, as described above. After the checkpoint is removed from the alternate controller, control then flows to block 314.

At block 314, the modifiable data and metadata associated with the write command that was locked at block 204 of FIG. 2 is unlocked. The techniques used to unlock the locked data and metadata can be substantially similar to those used to lock the data and metadata. For example, if a flag indicating that particular data or metadata is locked is set, the same flag can be unset to indicate that the data or metadata is unlocked, indications that data should be unlocked can be sent to backing stores, etc. After the locked data and metadata is unlocked, the process ends.

If an adverse event occurs, a component, such as a controller, can be responsible for determining whether data is to be recovered. For example, while a controller is booting up, the controller can determine whether the controller was properly shut down. For example, the shutdown sequence for the controller might set a flag in persistent memory that indicates that the controller was shut down properly. If, on startup, the controller determines that the controller was not shutdown properly, a recovery process can be started. As at least part of the recovery process, the controller can determine whether any atomic write operations were interrupted and either rollback or recover (commit) the data associated with the atomic write operations. This ensures that, even if an atomic write operation was interrupted, the data is either all old data or all new data, not a mix of old and new data.

Figure 4:
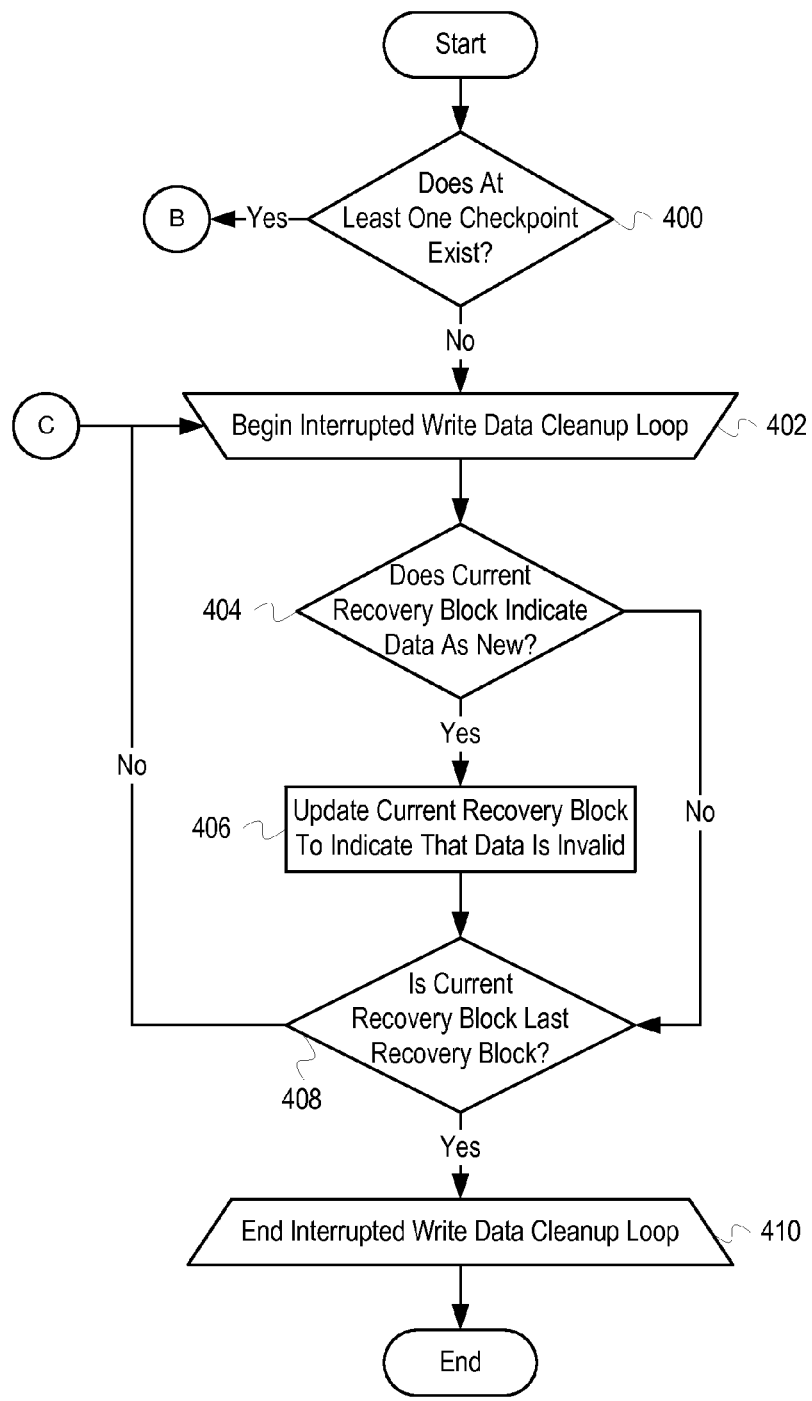
FIG. 4 depicts a first set of example operations for recovering from an interrupted atomic write operation.
Figure 5:
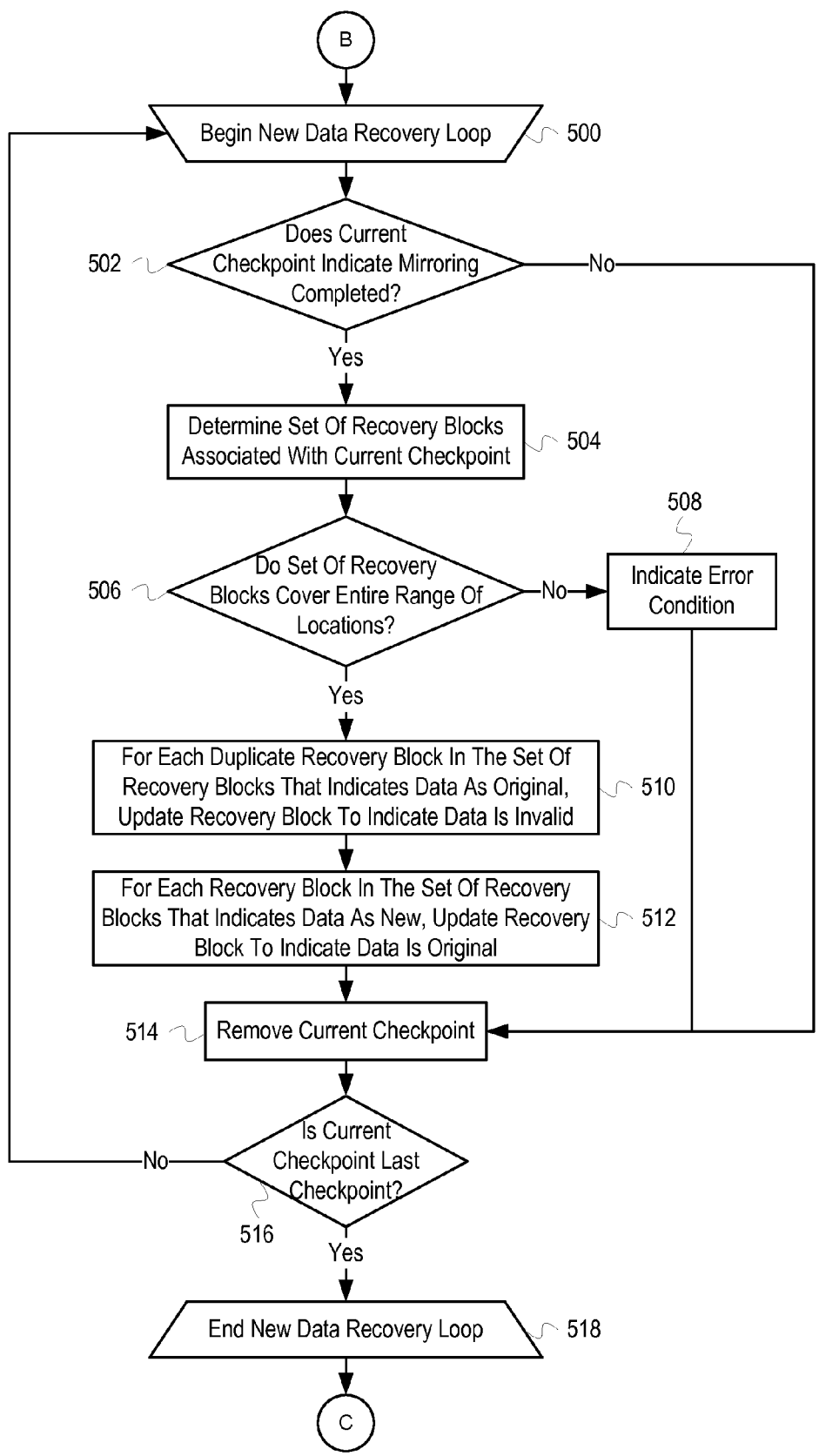
FIG. 5 depicts a second set of example operations for recovering from an interrupted atomic write operation.

FIGS. 4 and 5 depict flowcharts of example operations for recovering from an interrupted atomic write operation. The operations depicted in FIGS. 4 and 5 and described below can be performed by the first controller 104 and/or the second controller 106 depicted in FIG. 1, but are not limited to the implementations described above.

FIG. 4 depicts a first set of example operations for recovering from an interrupted atomic write operation.

At block 400, it is determined whether at least one checkpoint exists. A checkpoint is saved to mark completion of an atomic write operation. The location in which checkpoints are saved, such as persistent memory, can be read to determine if any checkpoints were stored and not removed prior to the recovery process being initiated. If it is determined that no checkpoints exist, control then flows to block 402. If it is determined that at least one checkpoint exists, control then flows to block 500 of FIG. 5.

At block 402, an interrupted write data cleanup loop begins. The interrupted write data cleanup loop removes any data associated with a write operation that had begun but did not complete. For example, assume a controller implements the operations described in FIG. 2. If the controller loses power while performing the operation depicted at block 206 of FIG. 2, the data associated with the write would be stored in the cache and the indications of the associated data would be stored in the cache index table. However, only some (or none) of the recovery blocks would have been updated. Because all of the old data still exists and the new data was not completely written, the new data should be invalidated. Thus, the data associated with the interrupted write is invalidated.

During the first pass through the loop, any data used by the loop can be initialized. For example, variables can be initialized or set to default values, counters reset, etc. The loop iterates over each of the recovery blocks, and thus selects an initial recovery block as the current recovery block. If the recovery blocks are stored in an ordered data structure, such as a list or table, for example, the first recovery block in the data structure might be selected as the current recovery block. On each subsequent pass, the current recovery block is updated to the next recovery block. For example, the next recovery block might be the recovery block that comes sequentially after the current recovery block in the data structure. The operation can be adapted for other data structures and other implementations. Further, the data structure that includes the recovery blocks might not be iterated over directly. For example, the cache index table may be iterated over instead, with the current recovery block being indicated by the index in the current cache index table entry. After the interrupted write data cleanup loop is initialized, control then flows to block 404.

At block 404, it is determined whether the current recovery block indicates that the data in the cache block associated with the current recovery block is new. The manner in which the current recovery block indicates that the data in the associated cache block is new can vary between implementations. For example, a flag in the current recovery block might indicate that the data is new, a set of bits or a variable are set to a value indicating that the data is new, etc. If it is determined that the current recovery block indicates that the data in the associated cache block is new, control then flows to block 406. If it is determined that the current recovery block indicates that the data in the associated cache block is not new (old or invalid, for example), control then flows to block 408.

At block 406, the current recovery block is updated to indicate that the data in the associated cache block is invalid. For example, a flag in the current recovery block might be set, a set of bits or a variable might be set to a value indicating that the data is invalid, etc. Updating the current recovery block to indicate that the data in the associated cache block is invalid effectively frees up the location in the cache and other data structures associated with that cache block. After the current recovery block is updated to indicate that the data in the associated cache block is invalid, control then flows to block 408.

At block 408, it is determined whether the current recovery block is the last recovery block. In other words, it is determined whether all recovery blocks have been iterated over. If it is determined that the current recovery block is the last recovery block, control then flows to block 410. If it is determined that the current recovery block is not the last recovery block, control then flows back to block 402.

At block 410, the interrupted write data cleanup loop is completed. At this point, any recovery blocks associated with an incomplete write have been invalidated, thus allowing the associated cache blocks and cache index table entries to be reused along with the recovery blocks. No recovery block that is associated with old data are impacted. Any data and/or metadata used to facilitate the loop can also be cleaned up. After the interrupted write data cleanup loop is completed, the process ends.

FIG. 5 depicts a second set of example operations for recovering from an interrupted atomic write operation.

Control flowed to block 500 if it was determined, at block 400 of FIG. 4, that at least one checkpoint exists. At block 500, a new data recovery loop begins. The new data recovery loop finishes committing the data associated with the write operation that was interrupted. During the first pass through the loop, any data used by the loop can be initialized. For example, variables can be initialized or set to default values, counters reset, etc. The loop iterates over each checkpoint, and thus selects an initial checkpoint as the current checkpoint. If the checkpoints are stored in an ordered data structure, such as a list or table, for example, the first checkpoint in the data structure might be selected as the current checkpoint. On each subsequent pass, the current checkpoint is updated to the next checkpoint. For example, the next checkpoint might be the checkpoint that comes sequentially after the current checkpoint in the data structure. The operation can be adapted for other data structures and other implementations. After the new data recovery loop is initialized, control then flows to block 502.

At block 502, it is determined whether the current checkpoint indicates that mirroring was completed. For example, the current checkpoint might include a flag that, if set, indicates that mirroring was completed. Similarly, a set of bits or a variable might be set to a value indicating that mirroring was completed. In some implementations, mirroring might be optional. In such cases, the current checkpoint can be set to indicate that mirroring completed. If it is determined that the current checkpoint indicates that mirroring completed, control then flows to block 504. If it is determined that the current checkpoint indicates that mirroring did not complete, control then flows to block 514.

At block 504, the set of recovery blocks that are associated with the current checkpoint are determined. The checkpoint can indicate a volume identifier and a range of locations. The recovery blocks can also indicate a volume identifier, as well as a location. The recovery blocks can be iterated over, and the set of recovery blocks associated with the current checkpoint are the recovery blocks that have the same volume identifier as the checkpoint and a location within the range of locations indicated by the current checkpoint. After the set of recovery blocks that are associated with the current checkpoint are determined, control then flows to block 506.

At block 506, it is determined whether the set of recovery blocks cover the entire range of locations specified by the current checkpoint. As described above, a recovery block is associated with a cache block. A cache block can encompass multiple locations and can be identified by the location corresponding to the start of the cache block. For example, a cache block that is associated with data at bytes 100 through 200 might be identified by byte 100. Each recovery block can be identified by the same location as the associated cache block (e.g., the cache block and recovery block can be identified by the same index, allowing a cache index table entry to refer to both). For example, the current checkpoint might specify the location range as byte 125 through byte 200. If each cache block contains fifty bytes, a set of two recovery blocks that are identified by locations 100 and 150 covers the entire range of locations specified by the current checkpoint. However, if the current checkpoint specifies the location range as byte 125 through byte 250, a set of two recovery blocks that are identified by locations 100 and 150 do not cover the entire range of locations specified. If it is determined that the set of recovery blocks does not cover the entire range of locations specified by the current checkpoint, control then flows to block 508. If it is determined that the set of recovery blocks does cover the entire range of locations specified by the current checkpoint, control then flows to block 510.

At block 508, an error condition is indicated. How the error condition is indicated can vary between implementations. For example, in some implementations, if the current checkpoint indicates a host, an indication specifying the volume identifier and range of locations associated with the write might be sent to the host. In some implementations, a predetermined pattern is written to the locations specified by the current checkpoint, thus indicating to any hosts that read the data from those locations that the data is invalid. Further, additional operations might be performed to recover from the error condition. After the error condition is indicated, control then flows to block 514.

Control flowed to block 510 if it was determined, at block 506, that the set of recovery blocks covers the entire range of locations specified by the current checkpoint. At block 510, all duplicate recovery blocks in the set of recovery blocks that indicate the data in the associated cache block is old are updated to indicate that the data in the associated cache block is invalid. For example, consider a scenario in which a write operation is interrupted before all recovery blocks associated with the old data are set to indicate that the data is invalid (as in block 300 of FIG. 3). Duplicate recovery blocks will exist for some locations, with a first recovery block of the duplicate recovery blocks indicating that the data in the cache block associated with the first recovery block is old, while the second recovery block indicates that the data in the cache block associated with the second recovery block is new. In other words, the old data of a target location was not discarded and the new data of the target location was not committed prior to the write operation being interrupted. To complete the write operation that was interrupted, the old data is discarded by updating the recovery block associated with the old data to indicate that the old data is invalid. The recovery blocks can be updated to indicate that the data is invalid as described above. Further, there might be no duplicates. For example, if the write operation is interrupted after the recovery blocks associated with the old data are updated to indicate that the data is invalid, there would be no duplicate recovery blocks. After all duplicate recovery blocks in the set of recovery blocks that indicates the data in the associated cache blocks are old are updated to indicate that the data in the associated cache blocks are invalid, control then flows to block 512.

At block 512, all recovery blocks in the set of recovery blocks that indicates the data in the associated cache blocks are new are updated to indicate that the data in the associated cache blocks are old. Because the recovery blocks associated with cache blocks that contain old data are updated to indicate that the data is invalid above, the new data is committed. Thus, the remaining recovery blocks, duplicates or not, associated with cache blocks that contain new data are updated to indicate that the data is old. The recovery blocks can be updated to indicate that the data is invalid as described above. After all recovery blocks in the set of recovery blocks that indicates the data in the associated cache blocks are new are updated to indicate that the data in the associated cache blocks are old, control then flows to block 514.

Control flowed to block 514 if it was determined, at block 502, that the current checkpoint does not indicate that mirroring was completed. Control also flowed to block 514 from block 512. At block 514, the current checkpoint is removed. The removal of the current checkpoint can vary between implementations. For example, the removal of the current checkpoint can comprise initializing the data that represents the current checkpoint, setting a flag, etc. In the case that mirroring was not completed, removing the checkpoint allows for the interrupted write data cleanup loop (blocks 402 through 410 of FIG. 4) to recover the old data. After the current checkpoint is removed, control then flows to block 516.

At block 516, it is determined whether the current checkpoint is the last checkpoint. In other words, it is determined whether all checkpoints have been iterated over. If the current checkpoint is the last checkpoint, control then flows to block 518. If the current checkpoint is not the last checkpoint, control then flows back to block 500.

At block 518, the new data recovery loop is completed. At this point, any remaining old data that was not discarded before the write operations were interrupted has been discarded. Further, all new data that was not committed before the write operations were interrupted has been committed and the checkpoints removed to indicate completion of the write operations. After the new data recovery loop is completed, control then flows to block 402 of FIG. 4.

Control flows to block 402 of FIG. 4 from block 518 in order to ensure that any data associated with write operations that did not complete are cleaned up. Consider a scenario in which a first write operation completed but had not been fully committed when an adverse event occurred. Further, a second write operation was in progress, but had not completed, when an adverse event occurred. The recovery process depicted in FIG. 5 and described above only completes the first write operation, but does nothing for the second write operation because no checkpoint exists for the second write operation. Thus, after committing the write operations that were completed, any write operations that did not complete are rolled back.

FIG. 4 depicts the determination of whether to perform the interrupted write data cleanup or the new data recovery loop as being based on whether a checkpoint exists. However, some implementations might include additional metadata, similar to a checkpoint, that indicates that a write operation has started. When a checkpoint for the write operation is created, the metadata indicating that the write operation has started can be discarded. In such an implementation, if no checkpoint exists (or after all checkpoints are recovered from), it can be determined if metadata indicating that the write operation has started exists. If not, no write operation was interrupted prior to creating and storing a checkpoint and the operations depicted in blocks 402-410 need not be performed except for scenarios in which mirroring was not completed.

The component responsible for performing the operations for recovering from an interrupted atomic write operation might not be the component that determines that the recovery operations should be performed. For example, a first component in a controller might perform the startup sequence. The first component might determine that the controller did not shut down properly, and then might indicate to a second component that the recovery operations are to be performed. The second component might then perform the actual recovery operations. Further, the second component might only perform a subset of the recovery operations, while other components perform the other recovery operations.

Atomic write operations are implemented by performing operations in such a manner that if a write operation is interrupted at any point in time, the data affected can either be rolled back or committed when the component resumes operation. For example, the operations depicted at block 510 of FIG. 5 and described above are specifically implemented to handle a scenario in which a write operation is interrupted at any point between block 210 of FIG. 2 (or block 222 of FIG. 2 if mirroring is enabled) and block 302 of FIG. 3. However, implementations can vary. For example, additional metadata may be used, such as including some of the metadata associated with recovery blocks with the cache blocks as well (as described above). Thus, additional operations, fewer operations, or modified operations may be performed in different implementations. For example, if additional metadata is used, the write operations might be modified to include an additional operation that updates the additional metadata. When the implementation of the write operations change, the implementation of the recovery operations might change as well. For example, if an additional operation is added to update additional metadata, an additional operation might be added to the recovery operations to reset the additional metadata. Similarly, the operations involved in mirroring data can impact the operations involved in recovering the data. Further, the specific data mirrored can vary between implementations. For example, in some implementations, the cache index table/cache index table entries might not be mirrored. Further, when recovering from an interrupted write, similar operations to those depicted in FIGS. 4 and 5 might need to be performed on any alternate controllers that data is mirrored to. Operations performed on the alternate controller can be initiated or performed by the primary controller, such as described with FIG. 2. In some implementations, the alternate controller can perform the recovery operations itself.

Atomic write operations can be implemented for a storage controller that uses write-through caches as well, which function somewhat differently from write-back caches. As described above, write-back caches generally write data to the cache, only writing data to the storage device in certain scenarios. A write-through cache, on the other hand, writes data to both the cache and the storage device. All original data is overwritten by a write operation and thus data might not be recoverable.

In some implementations, the data written to a storage device is divided into smaller data units. For example, a write command might include thirty-two kilobytes of data to write to the disk. The data might actually be written in blocks of one kilobyte, however. Similarly, data may be "striped" across multiple disks, in which case the data can be broken up into data units that are the same size (or smaller) than a single stripe.

Some implementations that divide the data into smaller data units provide atomicity at the data unit level. A write log of incomplete write operations can be maintained in persistent memory. The write log comprises indications of each of the smaller data units, such as the volume identifier and the locations affected by the write operations to the smaller data units. An indication of a write operation to the smaller data unit is stored in the write log prior to beginning the write operation and removed after completing the write operation. Because the write log is maintained in persistent memory, the write log indications remain even if power is lost. Thus, the controller can determine which write operations to the smaller data units did not complete by analyzing the indications. If an indication was not removed from the write log, the associated write operation did not complete and the controller can write a predetermined pattern to the associated locations. The predetermined pattern, sometimes called an interrupted write pattern, can indicate to a host that the data is invalid.

However, because the indications only indicate the smaller data units, an adverse event can lead to some of the smaller data units containing original data, some of the smaller data units containing new data, and some of the smaller data units containing the predetermined pattern. For example, a write operation might be broken up into three smaller data units, with each data unit being written sequentially. If power is lost while the second data unit is being written, the first data unit will include the new data, the second data unit will have the predetermined pattern written to it, and the third data unit will have original data.

A controller can be implemented to monitor the status of the entire write operation instead of just the smaller write operations, thus allowing for the predetermined pattern to be written to the entire range of locations affected by the write operation. By inserting an indication into the write log that describes the entire write operation, the controller can determine which locations were associated with the entire write operation.

Figure 6:
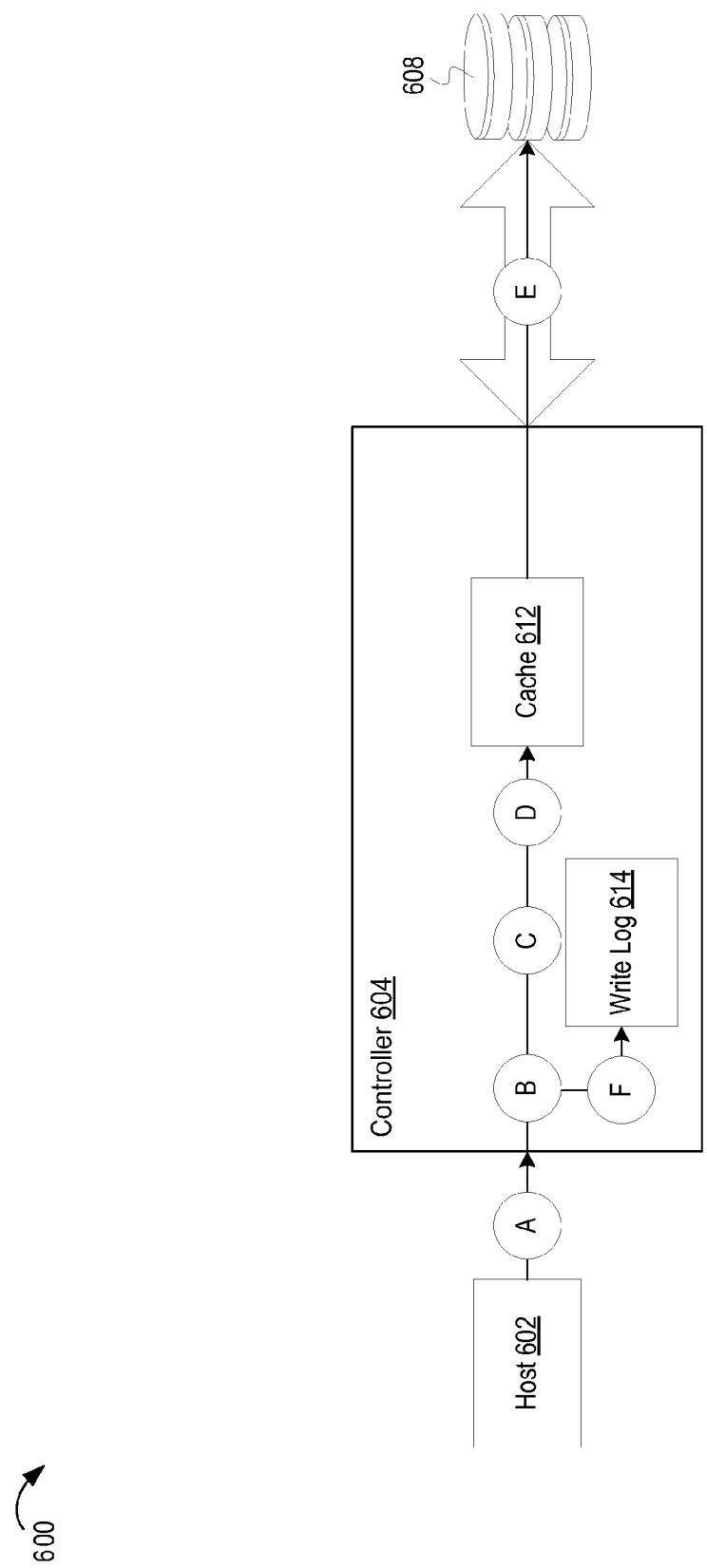
FIG. 6 depicts an example system for performing atomic write operations on one or more storage devices using a write-through cache.

FIG. 6 depicts an example system for performing atomic write operations on one or more storage devices using a write-through cache. FIG. 6 depicts a system 600, including a host 602, a controller 604, and a storage device 608. The controller 604 comprises a cache 612 and a write log 614. Similar to the system described in FIG. 1, the storage device 608 can be variously configured and the controller 604 may be coupled with multiple storage devices. The cache 612 can also be configured similarly to the cache described above. For example, the cache 612 can be divided into cache blocks and each cache block can be divided into logical blocks.

At stage A, the host 602 transmits, to the controller 604, a write command and the associated data to write. The write command can specify a volume identifier, memory address(es), etc. The write command and the data can conform to a particular protocol, such as the SCSI protocol, IP (Internet Protocol), etc. The amount of data transmitted can vary based on the protocol specifications, the total amount of data to write, etc.

At stage B, an indication of a write operation associated with the write command is stored in the write log 614. The indication of the write operation can include data that indicates the locations in the cache 612 and on the storage device 608 that are affected by the write operation. For example, the indication of the write operation might contain a volume identifier and a range of locations (such as memory addresses). Storing the indication of the write operation in the write log 614 while the write operation is in progress allows the controller 604 to determine which write operations did not complete after an adverse event.

At stage C, the data is partitioned into data units. Each data unit is the same size, or smaller, than the amount of data written to the storage device 608. In other words, while the write command received at stage A results in a write operation, the write operation is broken up into multiple, smaller write operations. If the associated data received at stage A is smaller than the data unit, no partitioning might be done.

The partitioning can be done based on the layout of the storage device 608 (or volumes located on the storage device 608). For example, if a volume on the storage device 608 is divided into stripes, the partitioning may be done on the stripe boundaries. For example, stripes might be thirty-two kilobytes in size. Thus, a write operation that starts at the beginning of kilobyte twenty-eight and is sixty-four kilobytes in length will be partitioned into three data units: a first that contains data for kilobytes 28-31, 32-64, and 64-92.

At stage D, the data units are written to the cache 612. The data can be written to the cache in a substantially similar manner as that described above. The cache 612 can be indexed by volume identifier and a location identifying the particular cache block. The cache 612 can also be indexed using a lookup table, similar to the use of the cache index table described above. The cache blocks might be the same size as the data units, thus resulting in a correspondence between the cache blocks and data units. The cache blocks might not be the same size as the data units, in which case the controller 604 may further divide and/or combine data units to correspond to the cache blocks.

At stage E, the data units are written to the storage device 608. The specific implementation of performing write operations to the storage device 608 can vary between implementations. For example, a controller that uses a SCSI protocol to communicate with the storage device 608 may perform the write operation differently than a controller that uses an IP-based protocol. The write operation might also comprise receiving an acknowledgement from the storage device 608 that the write operation, or each individual write operation for each data unit, completed.

At stage F, the indication associated with the write operation is removed from the write log 614. Once the controller 604 has completed writing each data unit to the storage device 608 (and received confirmation from the storage device 608 if appropriate), the controller 604 can remove the indication of the write operation. By removing the indication of the write operation, the controller 604 indicates that the write operation completed.

While the operations of writing to the cache 612 and writing to the storage device 608 are depicted as individual operations, in some implementations they can be viewed as a single operation or two operations that are not independent. For example, the controller 604 might be implemented such that the controller 604 writes the data to the cache 612 and the data passes through to the storage device 608. Or, for example, the controller 604 might write the data to the storage device by putting the address to write the data to on a set of address lines and the data on a set of data lines. The cache 612 might also be connected to the same set of address lines and same set of data lines, thus allowing the cache 612 to be written in parallel.

Figure 7:
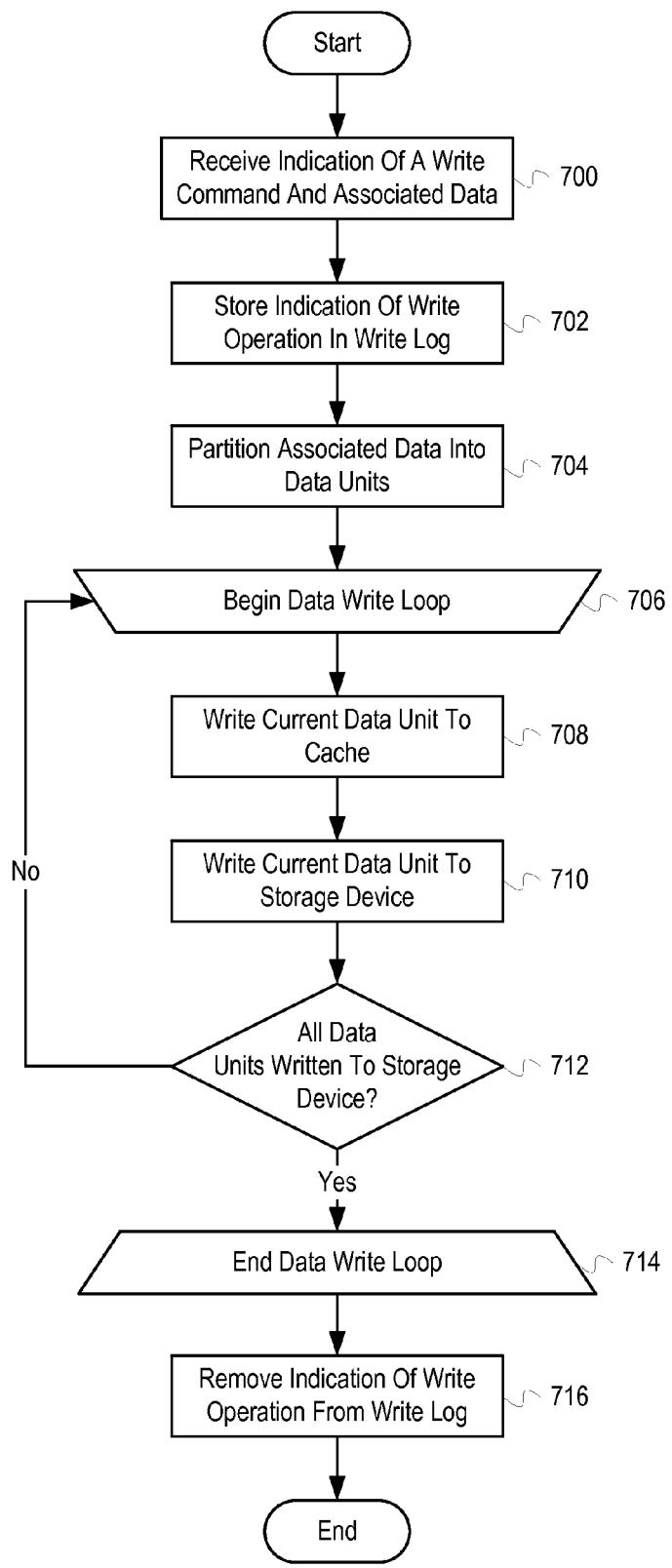
FIG. 7 depicts a flowchart of example operations for performing atomic write operations on one or more storage devices by a storage controller employing a write-through cache.

FIG. 7 depicts a flowchart of example operations for performing atomic write operations on one or more storage devices by a storage controller employing a write-through cache. The operations depicted in FIG. 7 and described below can be performed by the controller 604 depicted in FIG. 6, but are not limited to the implementations described above.

At block 700, an indication of a write command and data associated with the write command is received. The indication of the write command indicates the host requesting the write and a target for the write. The target for the write can be expressed with a volume identifier and a location to write the associated data, such as a memory address. The indication of the target can also indicate any one of a length and an ending address. The indication can conform to a particular protocol. The associated data can be received as part of the write command or separately. The associated data can also conform to a particular protocol. The indication might also implicitly or explicitly indicate a range of locations. For example, if the write command specifies a particular byte within memory to write the associated data, but the associated data is thirty-two bytes long, the implicit range of locations are the thirty-two bytes in memory that start at the specified byte. Similarly, the write command might include the starting location as well as the location at which the write operation should end. The descriptions herein assume that the write command implicitly specifies a range of locations by specifying the starting location. However, the operations described can be adapted to other implementations. After the indication of the write command and associated data is received, control then flows to block 702.

At block 702, an indication of the write operation is stored in a write log. The indication of the write operation can include a volume identifier and location. The write log can be in the form of a table, list, queue, or other data structure that facilitates the functionality described herein. The indication can be an entry in the data structure and might include other data that facilitates the functionality described herein or for other purposes. The indication can be stored in a particular location in memory that is associated with the write log, might be stored in any location in memory and referenced by a lookup table, etc. After the indication of the write operation is stored in the write log, control then flows to block 704.

At block 704, the associated data is partitioned into data units. The data units are units of data that correspond to how the data is written to a storage device. For example, if data is written to a storage device on a per stripe basis, the data units can correspond to the stripes on the storage device. After the associated data is partitioned into data units, control then flows to block 706.

At block 706, a data write loop is begun. The data write loop iterates over each of the data units and writes the data unit to the cache and storage device. During the initial pass through block 706, the data write loop can be initialized. For example, variables used during the data write loop can be initialized, counters reset, etc. Further, a first data unit is selected as the current data unit, which is the data unit referenced during a particular iteration. On subsequent passes, the loop variables, counters, etc., can be updated as appropriate. Further, the current data unit is updated to be a next data unit. The next data unit can be any data unit that has not been iterated over (i.e., has not been a current data unit). However, in some implementations, the data units might be written in a particular order. Thus, the next data unit may be a specific data unit that comes sequentially after the current data unit in the established order. After the data write loop is initialized, control then flows to block 708.

At block 708, the current data unit is written to the cache. As described above, the size of the current data unit can correspond to the size of a cache block and thus be written directly to a cache block. The current data unit might also be split between cache blocks. The particular cache block(s) used can be selected using various techniques, as described above. If the cache is associated with additional metadata, such as a cache index table, the additional metadata can also be updated when the current data unit is written to the cache. After the current data unit is written to the cache, control then flows to block 710.

At block 710, the current data unit is written to the storage device. As described above, the specific implementation of the write operation can vary between implementations, based on such factors as the protocol used, format of the storage device, etc. Additionally, as described above, the write operation might also include receiving an indication that the write operation to the storage device completed. After the current data unit is written to the storage device, control then flows to block 712.

At block 712, it is determined whether all data units have been written to the storage device. In other words, it is determined whether all data units have been iterated over. If all data units have been written to the storage device, control then flows to block 714. If not all data units have been written to the storage device, control then flows back to block 706.

At block 714, the data write loop is completed. All data units for the write operation have been written to the cache and the storage device. Thus, the write operation is completed. Any variables, counters, and other data used for the loop can be cleaned up. After the data write loop is completed, control then flows to block 716.

At block 716, the indication of the write operation is removed from the write log. The manner in which the indication is removed from the write log can vary between implementations. For example, the data representing the indication might be initialized, a flag set to indicate that the indication is invalid, the indication removed from a data structure, etc. Once the indication is removed, the data written is committed and the write operation cannot be interrupted.

FIG. 7 depicts the data units being written sequentially. However, in some implementations, the data units may be written in parallel. For example, it may take a period of time before a data unit is written to the storage device and an acknowledgement is received. A write command for a first data unit can be sent to the storage device. While waiting for an acknowledgement, a second data unit can be written to the cache and sent to the storage device. A counter can be incremented to track the number of write commands sent to the storage device. When an acknowledgement is received, the counter is decremented. Thus, when write commands for all data units have been sent to the storage device and the counter is equal to zero, all data units have been written to the storage device.

As described above, if an adverse event occurs, a component, such as a controller, can be responsible for determining whether data is to be recovered. For example, while a controller is booting up, the controller can determine whether the controller was properly shut down. For example, the shutdown sequence for the controller might set a flag in persistent memory that indicates that the controller was shut down properly. If, on startup, the controller determines that the controller was not shutdown properly, a recovery process can be started. As at least part of the recovery process, the controller can determine whether any atomic write operations were interrupted and either recover (commit) the data associated with the atomic write operations or write a predetermined pattern to the locations associated with the atomic write operation. This ensures that, even if an atomic write operation was interrupted, the data is either all new data or an indication that the data is invalid is provided to the host.

Figure 8:
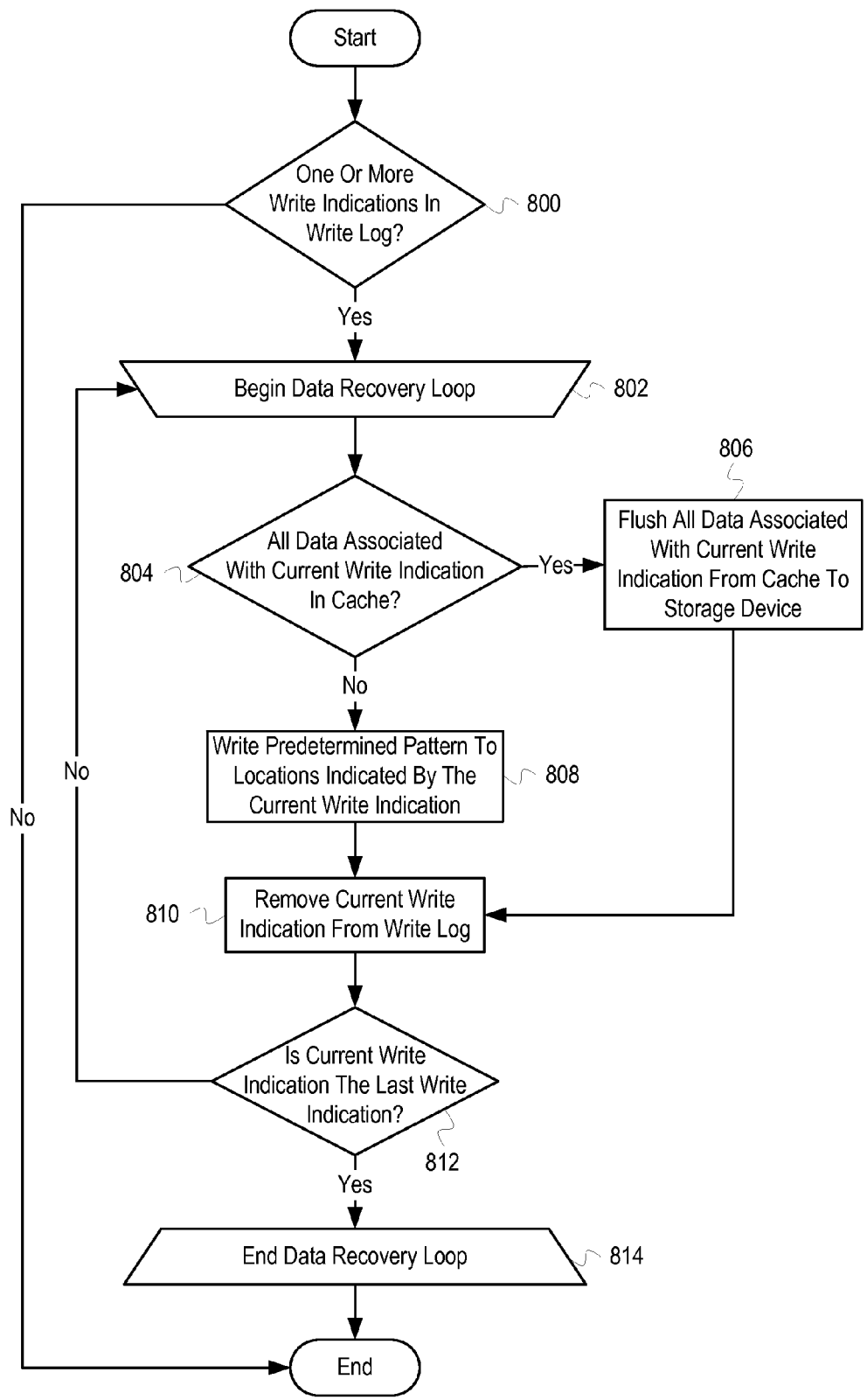
FIG. 8 depicts a flowchart of example operations for recovering from an interrupted atomic write operation when using a write-through cache.

FIG. 8 depicts a flowchart of example operations for recovering from an interrupted atomic write operation when using a write-through cache. The operations depicted in FIG. 8 and described below can be performed by the controller 604 depicted in FIG. 6, but are not limited to the implementations described above.

At block 800, it is determined whether one or more indications of write operations are in the write log. For example, the write log can be analyzed for entries that are not indicated as invalid or contain data indicating a write operation. If it is determined that one or more write operations are in the write log, control then flows to block 802. If it is determined that no write operations are in the write log, the process ends.

At block 802, a data recovery loop begins. In the data recovery loop, each indication of a write operation in the write log is iterated over. For each of the indications, it is determined whether the data associated with the write option is in the cache. If it is, the data is flushed to the storage device. If it is not, the predetermined pattern is written to the storage device at the locations specified by the indication.

On the first pass through block 802, any variables, counters, etc. used for the loop can be initialized. Further, a current write indication is set to be a first indication from the write log. On each subsequent pass through block 802, any of the variables, counters, etc. used for the loop can be updated as appropriate. Further, the current write indication can be set to a next write indication. The next write indication can be any indication in the write log that has not been iterated over, unless the indications are to be handled in a particular order. In cases in which the indications are to be handled in a particular order, the next write indication is the indication that comes sequentially after the current write indication in the established order. After the data recovery loop begins, control then flows to block 804.

At block 804, it is determined whether all data associated with the current write indication is in the cache. In some implementations, the cache might be implemented with persistent memory. Thus, there might be scenarios in which an adverse event occurs and the cache is not erased, as if it were in non-persistent memory. Further, not all adverse events result in a total power loss, in which case the cache might still contain the data from before the adverse event. If all of the data for a particular write operation is located in the cache, it can be flushed to the storage device to complete the write operation.

As described above, indications of write operations can indicate a volume identifier and a range of locations associated with the write operation, as well as a requesting host. The indications of write operations can also include metadata about the status of the associated write operation. For example, after all data associated with the write operation is written into the cache, a flag might be set in the associated indication indicating that all of the data was written to the cache. Additional metadata might also be included in the cache blocks that indicate that the data is new data. Once the data in a particular cache block is written to the storage device, the metadata in the cache block can be updated to indicate that the data is old data. Regardless of the particular implementation, the metadata and data structures can be analyzed to determine if all locations specified by the current write indication are located in the cache.

If it is determined that all data associated with the current write indication is in the cache, control then flows to block 806. If it is determined that not all data associated with the current write indication is in the cache, control then flows to block 808.

At block 806, the data associated with the current write indication is flushed from the cache to the storage device. To flush the data from the cache to the storage device, the data is written to the proper locations on the storage device. In other words, when using a write-through cache, the data in the cache should mirror a subset of the data on the storage device. In the scenario of a write operation being interrupted before all associated data was written to the storage device, but after all associated data was written to the cache, the cache contains a more up-to-date version of the data. Thus, the data is effectively mirrored from the cache to the storage device by writing the data to the appropriate locations. After all data associated with the current write indication is flushed from the cache to the storage device, control then flows to block 810.

Control flowed to block 808 if it was determined, at block 804, that not all data associated with the current write indication is located in the cache. At block 808, the predetermined pattern is written to the locations indicated by the current write indication. The predetermined pattern is written both to the cache at the appropriate locations and to the storage device at the appropriate locations. The locations can be determined based, at least in part, on the range of locations specified in the current write indication. The predetermined pattern can be defined by the particular protocol used, by an administrator, etc. Generally, the predetermined pattern is chosen such that the pattern will not reflect actual data, thus allowing a host to rely on the predetermined pattern to indicate invalid data. The actual predetermined pattern used can vary between implementations. After the predetermined pattern is written to the locations indicated by the current write indication, control then flows to block 810.

Control flowed to block 810 from blocks 808 and 806. At block 810, the current write indication is removed from the write log. Removing the current write indication from the write log indicates either the completion of the interrupted write operation or the writing of the predetermined pattern to the locations associated with the interrupted write operation. The current write indication can be removed by initializing the data associated with the current write indication in the write log, setting a flag, removing it from a data structure, etc. After the current write indication is removed from the write log, control then flows to block 812.

At block 812, it is determined whether the current write indication is the last write indication. In other words, it is determined whether all write indications in the write log have been iterated over. For example, the write log can be analyzed to determine if all write indications have been removed, if the current write indication is the last write indication in a list of write indications, etc. If it is determined that the current write indication is the last write indication, control then flows to block 814. If it is determined that the current write indication is not the last write indication, control then flows back to block 802.

At block 814, the data recovery loop is completed. Each write indication in the write log have been iterated over and removed from the write log. The locations associated with each write indication have either had associated data flushed from the cache to the storage device or the predetermined pattern written to the cache and the storage device. Any data used for the loop can be cleaned up. After the recovery loop is completed, the process ends.

It should be noted that a write-back cache, in this context, is generally in persistent memory, thus preventing the data in the cache from being erased when power is lost (or in a subset of power loss scenarios). Further, at least some of the metadata associated with the write-back cache, such as the recovery blocks, are also located in persistent memory. If a write-back cache and the metadata were not located in persistent memory, any data that was not flushed to the storage device would be lost. Because data being written to a write-through cache is written to the storage device when the data is written to the cache, the data in the cache is also mirrored on the storage device (which is typically persistent memory). However, the write log for a write-through cache is located in persistent memory.

It should be noted that the specific type of persistent memory used for the data structures can be, in general, any type of persistent memory. For example, volatile memory, such as RAM, can be made persistent by adding a backup power source, such as a battery, to the memory. Similarly, NVSRAM (non-volatile static random access memory), which does not rely on a backup power source, can be used. Specific types of persistent memory might be appropriate for specific implementations, however. For example, in some implementations, a write-through cache can be used as a failover solution if a write-back cache cannot be used. For example, a write-back cache might be used as long as there was sufficient battery power to maintain the data in battery-backed RAM. If the battery power falls below a certain threshold or the power source otherwise fails, the controller might begin using a write-through cache that utilizes NVSRAM. Other examples of persistent memory include flash memory, hard disks, etc.

As described above, a write-through cache can be used when a write-back cache cannot. In many implementations, a determination regarding whether a write-back cache can be used or not is based on determining whether one or more conditions exist that would result in the loss of data if a failure occurred. For example, as described above, if a write-back cache is stored in battery-backed RAM and the battery power is insufficient to maintain the data in RAM should a power loss occur, loss of the data would result. Various other conditions can exist, depending on the particular implementation. For example, a cache backup device may be unavailable, an alternate (backup/failover) controller is unavailable, mirroring is disabled, etc. When multiple data protection mechanisms are used, a write-through cache might be used even if only a subset of the data protection mechanisms have failed. The use of a write-back cache might resume when the conditions resulting in use of a write-through cache no longer exist. Additionally, in some implementations, a cache might function as either a write-back cache or write-through cache. For example, a write command might indicate that the data should be written to the backing store prior to acknowledging completion of the write. In such a case, a controller would write the data to the cache and, immediately after or contemporaneously with, write the data to the backing store. The controller would only acknowledge the write after the data is written to the backing store instead of after the data is written to the cache.

In some implementations, multiple preventative measures might be implemented to prevent data loss. For example, a write-back cache may be stored in battery-backed RAM and the data may be mirrored to an alternate controller. While the loss of one mechanism might not result in data loss should a failure occur, some implementations may still utilize a write-through cache As example flowcharts, FIGS. 2-5 and 7-8 present operations in an example order from which implementations can deviate (e.g., operations can be performed in a different order than illustrated and/or in parallel; additional or fewer operations can be performed, etc.). For example, FIG. 4 can include operations at the beginning that creates lists for the checkpoints, the recovery blocks that include indications of original data, and the recovery blocks that include indications of new data. In implementations that do not support mirroring, the operation(s) depicted in block 502 of FIG. 5 might be excluded completely. As another example, storing an indication of a write operation in a write log, as depicted in block 702 of FIG. 7, can be performed subsequent to partitioning the associated data into data units, as depicted at block 704 of FIG. 7.

As will be appreciated by one skilled in the art, aspects of the inventive subject matter may be embodied as a system, method or computer program product. Accordingly, aspects of the inventive subject matter may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include signals.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The term "computer" as used herein comprises any kind of computing system, machine, or device, including a personal computer, a laptop, a server, a tablet, a smartphone, a smartwatch, etc. A computer can also comprise a computing system that is communicatively coupled with other computer systems to form a set of computing systems that coordinate to perform functions similar to that of a single computing system. Further, a computer can comprise the aforementioned set of coordinated computing systems. In other words, where the descriptions herein refer to a computer, a distributed computing system, grid computing system, cloud computing system, etc. can be used.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the inventive subject matter are described with reference to flowchart illustrations and/or block diagrams of methods, apparatus (systems) and computer program products according to implementations of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
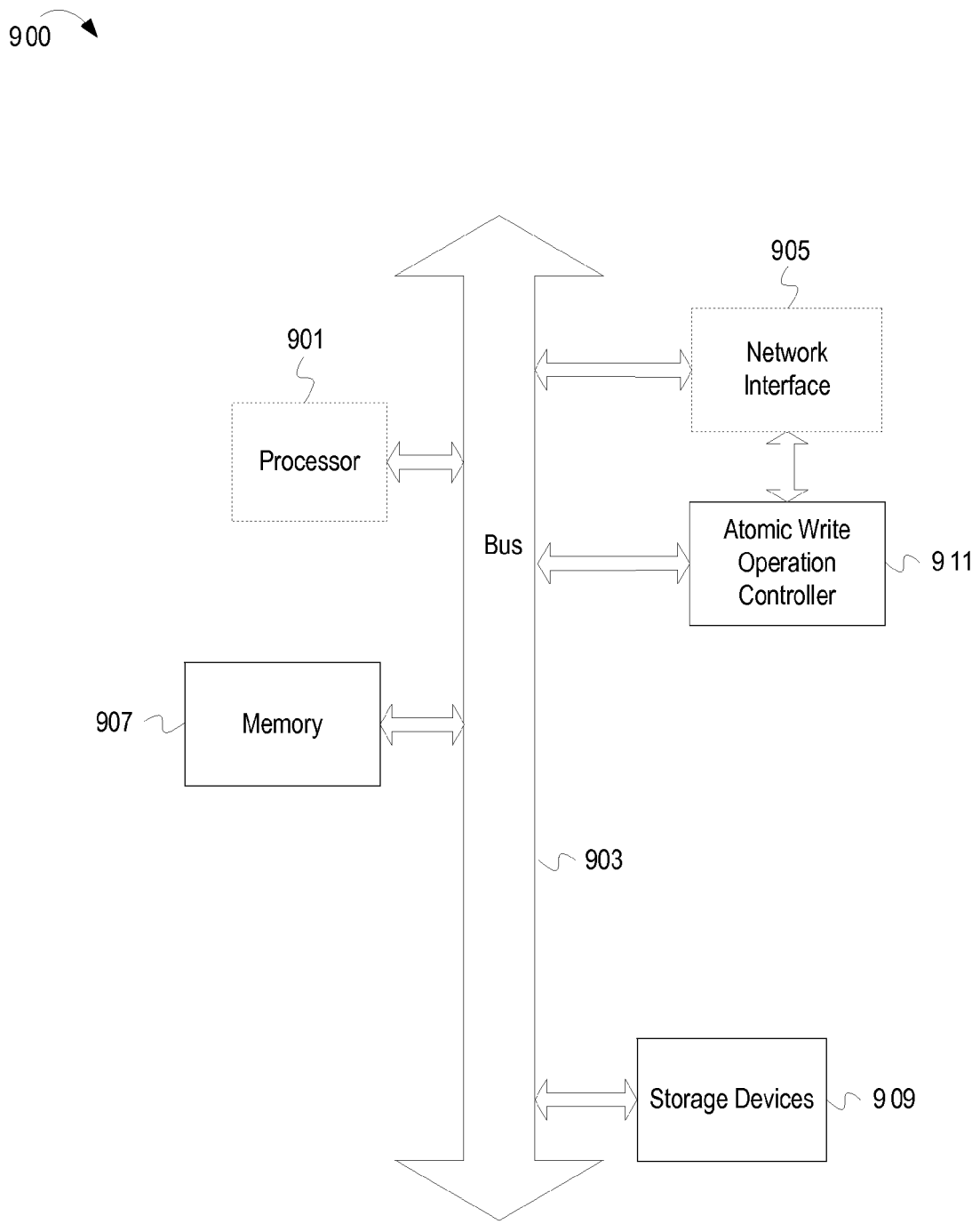
FIG. 9 depicts an example computer system for performing atomic write operations.

FIG. 9 depicts an example computer system for performing atomic write operations. A computer system 900 includes a processor 901 (possibly including multiple processors, multiple cores, multiple nodes, and/or implementing multi-threading, etc.). The computer system 900 includes memory 907. The memory 907 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of computer readable media. The computer system 900 also includes a bus 903 (e.g., PCI, ISA, PCI-Express, HyperTransport®, InfiniBand®, NuBus, etc.), a network interface 905 (e.g., an ATM interface, an Ethernet interface, a Frame Relay interface, SONET interface, wireless interface, etc.), and a storage device(s) 909 (e.g., optical storage, magnetic storage, etc.). The computer system 900 also includes an atomic write operation controller 911, which embodies functionality to implement aspects described above. The atomic write operation controller 911 may include one or more functionalities that facilitate ensuring consistent data on a logical volume or storage device after an adverse event. Any one of these functionalities may be partially (or entirely) implemented in hardware and/or on the processing unit 901. For example, the functionality may be implemented with an application specific integrated circuit, in logic implemented in the processor 901, in a co-processor on a peripheral device or card, etc. Further, realizations may include fewer or additional components not illustrated in FIG. 9 (e.g., video cards, audio cards, additional network interfaces, peripheral devices, etc.). The processor 901, the storage device(s) 909, and the network interface 905 are coupled to the bus 903. Although illustrated as being coupled to the bus 903, the memory 907 may be coupled to the processor 901.

While the aspects are described with reference to various implementations and exploitations, it will be understood that these aspects are illustrative and that the scope of the inventive subject matter is not limited to them. In general, techniques for performing write operations to storage devices as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
after receiving, at a storage controller, an indication of a write command that indicates a target location in storage associated with the storage controller and writing data of the write command into a first plurality of cache blocks of cache of the storage controller, determining a second plurality of cache blocks of the cache that correspond to storage locations to which the first plurality of cache blocks also correspond;
for each of the second plurality of cache blocks, preserving a reference to the cache block and indicating that data hosted in the cache block was stored in the cache block prior to receiving the write command;
for each of the first plurality of cache blocks, storing a reference to the cache block and indicating that data hosted in the cache block correspond to the write command;
after preserving the references to the second plurality of blocks and indicating that the data hosted in the second plurality of cache blocks precede the write command and after storing the references to the first plurality of cache blocks and indicating that the data hosted in the first plurality of cache blocks correspond to the write command, storing information that indicates the write command has been completed;
for each of the second plurality of cache blocks, indicating that the data hosted in the cache block is invalid after said storing information that indicates the write command has been completed and for each of the first plurality of cache blocks, clearing the indications that the data hosted in the cache block correspond to the write command, after data hosted in the second plurality of cache blocks have been indicated as invalid; and
clearing the information that was stored to indicate completion of the write command, after said clearing the indications that the data hosted in the first plurality of cache blocks correspond to the write command.

2. A method comprising:
after receiving, at a storage controller, an indication of a write command that indicates a target location in storage associated with the storage controller and writing data of the write command into a first plurality of cache blocks of cache of the storage controller, determining a second plurality of cache blocks of the cache that correspond to storage locations to which the first plurality of cache blocks also correspond;
for each of the second plurality of cache blocks, preserving a reference to the cache block and indicating that data hosted in the cache block was stored in the cache block prior to receiving the write command;
for each of the first plurality of cache blocks, storing a reference to the cache block and indicating that data hosted in the cache block correspond to the write command;
after preserving the references to the second plurality of blocks and indicating that the data hosted in the second plurality of cache blocks precede the write command and after storing the references to the first plurality of cache blocks and indicating that the data hosted in the first plurality of cache blocks correspond to the write command, storing information that indicates the write command has been completed, wherein said determining the second plurality of cache blocks that correspond to storage locations to which the first plurality of cache blocks also correspond comprises:
determining index values based, at least in part, on indications of the storage locations; and accessing a structure with the index values, wherein each of the index values indexes an entry in the structure with the index values that indicates a different one of the second plurality of cache blocks;

wherein said preserving the reference to the cache block for each of the second plurality of cache blocks comprises storing the references to the second plurality of cache blocks in a second structure; and wherein said storing the references to the first plurality of cache blocks comprises storing each of the references to the first plurality of cache blocks into the structure with the index values.

3. A method comprising:

after receiving, at a storage controller, an indication of a write command that indicates a target location in storage associated with the storage controller and writing data of the write command into a first plurality of cache blocks of cache of the storage controller, determining a second plurality of cache blocks of the cache that correspond to storage locations to which the first plurality of cache blocks also correspond;

for each of the second plurality of cache blocks, preserving a reference to the cache block and indicating that data hosted in the cache block was stored in the cache block prior to receiving the write command;

for each of the first plurality of cache blocks, storing a reference to the cache block and indicating that data hosted in the cache block correspond to the write command;

after preserving the references to the second plurality of blocks and indicating that the data hosted in the second plurality of cache blocks precede the write command and after storing the references to the first plurality of cache blocks and indicating that the data hosted in the first plurality of cache blocks correspond to the write command, storing information that indicates the write command has been completed;

after recovering from an adverse event, determining existence of the information that indicates the write command has been completed;

determining that the first and the second pluralities of cache blocks correspond to the information that indicates the write command has been completed;

for each of the second plurality of cache blocks, indicating that the data hosted in the cache block is invalid;

for each of the first plurality of cache blocks, clearing the indications that the data hosted in the cache block correspond to the write command; and removing the information that indicates the write command has been completed.

4. A method comprising:

after receiving, at a storage controller, an indication of a write command that indicates a target location in storage associated with the storage controller and writing data of the write command into a first plurality of cache blocks of cache of the storage controller, determining a second plurality of cache blocks of the cache that correspond to storage locations to which the first plurality of cache blocks also correspond;

for each of the second plurality of cache blocks, preserving a reference to the cache block and indicating that data hosted in the cache block was stored in the cache block prior to receiving the write command;

for each of the first plurality of cache blocks, storing a reference to the cache block and indicating that data hosted in the cache block correspond to the write command;

after preserving the references to the second plurality of blocks and indicating that the data hosted in the second plurality of cache blocks precede the write command and after storing the references to the first plurality of cache blocks and indicating that the data hosted in the first plurality of cache blocks correspond to the write command, storing information that indicates the write command has been completed;

after recovering from an adverse event, determining a reference to a third cache block of the cache that does not correspond to the information that indicates the write command has been completed;

determining whether the data hosted in the third cache block is indicated as preceding a write command or corresponding to a write command; and indicating the data hosted in the third cache block as invalid if the data hosted in the third cache block is indicated as corresponding to a write command.

5. The method of claim 1, further comprising:

determining that mirroring to an alternate storage controller is enabled; communicating, to the alternate controller, the first plurality of cache blocks, the indications that the data hosted in the first plurality of cache blocks correspond to the write command, the second plurality of cache blocks, and the indications that the data hosted in the second plurality;

communicating, to the alternate controller, the information that indicates the write command has completed; and in response to the alternate controller acknowledging receipt of the communicated information, indicating that mirroring is complete.

6. One or more computer readable storage media having program code encoded therein, the program code comprising program code to:

record indications of addressable units of a cache to which data of a write command has been written;

determine whether other addressable units of the cache are already indicated for storage locations that correspond to the write command;

indicate that the other addressable units of the cache represent a state of a subset of the cache in which the write command is not performed, wherein the subset of the cache corresponds to the addressable units and the other addressable units;

indicate that the addressable units of the cache represent a state of the subset of the cache in which the write command completes;

store data that indicates the write command for a machine that supplied the write command has completed after the addressable units of the cache are indicated as representing a state of the subset of the cache in which the write command completes and after the other addressable units of the cache are indicated as representing a state of the subset of the cache in which the write command is not performed;

after recovery from an adverse event, indicate data hosted in the other addressable units of the cache as invalid if the data that indicate the write command for the machine that supplied the write command does not indicate that the write command was completed; and after recovery from an adverse event, indicate data hosted in the addressable units of the cache as invalid if the data that indicate the write command for the machine that supplied the write command does not indicate that the write command was completed.

7. The computer readable storage medium of claim 6 further comprising program code to:
  determine whether mirroring to an alternate controller is enabled; if mirroring is enabled, communicate, to the alternate controller, that the addressable units of the cache are indicated as representing a state of the subset of the cache in which the write command completes;
  then communicate, to the alternate controller, that the other addressable units of the cache are indicated as representing a state of the subset of the cache in which the write command is not performed;
  then communicate, to the alternate controller, the data that indicates the write command was completed for the machine that supplied the write command; and
  indicate that mirroring is complete after receipt of acknowledgement of the communications from the alternate controller.

8. The computer readable storage medium of claim 6, wherein the program code to determine whether other addressable units of the cache are already indicated for storage locations that correspond to the write command comprise program code to:
  determine indexes based, at least in part, on the storage locations; and
  with each of the indexes, determine whether an entry already exists for the index in a structure that references the cache.

9. The computer readable storage medium of claim 8, wherein the program code to indicate that the other addressable units of the cache represent a state of the subset of the cache in which the write command is not performed comprises program instructions to:
  write indications of each of the other addressable units to a recovery structure that also references the cache.

10. The computer readable storage medium of claim 9, wherein the program code to indicate that the addressable units of the cache represent a state of the subset of the cache in which the write command completes comprises program code to:
  for each entry in the structure that already exists for one of the indexes, overwrite the entry with the one of the indications of the addressable units of the cache that corresponds to the one of the storage locations upon which the index is at least partly and indicate that data hosted in the addressable unit of the cache indicated in the entry is not yet committed.

11. The computer readable storage medium of claim 6, wherein the program code further comprises program code to:
  determine whether the cache operates as write-through cache; if the cache operates as write-through cache,
  store, in a memory that persists through adverse events, an indication of a write command received from a host;
  partition data of the write command into data units that each conform to a size of an individual write operation to a storage targeted by the write command;
  for each data unit, write the data unit into the cache and write the data unit to the storage; and
  remove the indication of the write command from the memory after all data units are written to the cache and the storage.

12. The computer readable storage medium of claim 11, wherein the program code further comprises program code to:
  iterate over each indication of a write command in the memory after recovering from an adverse event;
  for each indication of a write command,
    determine whether all data of the write command was written into the cache;
    if all of the data of the write command was written into the cache, write all of the data from the cache to storage locations corresponding to the write command;
    if all of the data of the write command was not written into the cache, write a predetermined data pattern to the storage locations and corresponding units of the cache; and
    remove the indication of the write command.

13. An apparatus comprising:
  a processor;
  a cache operable to host data of write commands received from hosts; a persistent memory;
  an interface to a storage device; and
  a computer readable storage medium having program code stored therein that is executable by the processor to cause the apparatus to, record indications of addressable units of a cache to which data of a write command has been written;
  determine whether other addressable units of the cache are already indicated for storage locations that correspond to the write command;
  indicate that the other addressable units of the cache represent a state of a subset of the cache in which the write command is not performed;
  indicate that the addressable units of the cache represent a state of the subset of the cache in which the write command completes;
  store data that indicates the write command for a machine that supplied the write command has completed after the addressable units of the cache are indicated as representing a state of the subset of the cache in which the write command completes and after the other addressable units of the cache are indicated as representing a state of the subset of the cache in which the write command is not performed;
  after recovery from an adverse event, indicate data hosted in the other addressable units of the cache as invalid if the data that indicate the write command for the machine that supplied the write command does not indicate that the write command was completed; and
  after recovery from an adverse event, indicate data hosted in the addressable units of the cache as invalid if the data that indicate the write command for the machine that supplied the write command does not indicate that the write command was completed.

14. The apparatus of claim 13, wherein the program code further comprises program code to:
  determine whether mirroring to an alternate controller is enabled; if mirroring is enabled, communicate, to the alternate controller, that the addressable units of the cache are indicated as representing a state of the subset of the cache in which the write command completes;
  then communicate, to the alternate controller, that the other addressable units of the cache are indicated as representing a state of the subset of the cache in which the write command is not performed;
  then communicate, to the alternate controller, the data that indicates the write command was completed for the machine that supplied the write command; and
  indicate that mirroring is complete after receipt of acknowledgement of the communications from the alternate controller.

15. The apparatus of claim 13, wherein the program code to determine whether other addressable units of the cache are already indicated for storage locations that correspond to the write command comprise program code to:
- determine indexes based, at least in part, on the storage locations;
- with each of the indexes, determine whether an entry already exists for the index in a structure that references the cache.

16. The apparatus of claim 15, wherein the program code to indicate that the other addressable units of the cache represent a state of the subset of the cache in which the write command is not performed comprises program instructions to:
- write indications of each of the other addressable units to a recovery structure that also references the cache.

* * * * *